United States Patent
Sigmar et al.

(10) Patent No.: US 9,938,777 B2
(45) Date of Patent: Apr. 10, 2018

(54) LAND DRILLING RIG AND METHODS OF ASSEMBLY

(71) Applicants: Axel Michael Sigmar, Lago Vista, TX (US); Richard Dwaine Souchek, Richmond, TX (US)

(72) Inventors: Axel Michael Sigmar, Lago Vista, TX (US); Richard Dwaine Souchek, Richmond, TX (US)

( * ) Notice: Subject to any disclaimer, the term of this patent is extended or adjusted under 35 U.S.C. 154(b) by 0 days.

(21) Appl. No.: 15/289,042

(22) Filed: Oct. 7, 2016

(65) Prior Publication Data
US 2017/0101826 A1  Apr. 13, 2017

Related U.S. Application Data

(60) Provisional application No. 62/238,687, filed on Oct. 7, 2015.

(51) Int. Cl.
*E21B 15/00* (2006.01)
*E04H 12/34* (2006.01)
(Continued)

(52) U.S. Cl.
CPC ........... *E21B 15/00* (2013.01); *E04H 12/345* (2013.01); *E21B 7/02* (2013.01); *E21B 19/14* (2013.01); *B65G 67/24* (2013.01); *E21B 33/06* (2013.01)

(58) Field of Classification Search
CPC . E21B 15/00; E21B 7/02; E21B 19/14; E21B 33/06; E04H 12/345; B65G 67/24
See application file for complete search history.

(56) References Cited

U.S. PATENT DOCUMENTS 2,983,341 A * 5/1961 Selberg ................... E21B 15/00
  52/119
3,385,014 A * 5/1968 Haug ................... B62D 55/084
  173/90
(Continued)

FOREIGN PATENT DOCUMENTS

CA  1085575  9/1980
CA  2834709 A1 * 12/2012  ............. E21B 15/00
(Continued)

OTHER PUBLICATIONS

PCT/US16/56162, Search Report and Written Opinion, dated Feb. 23, 2017, 12 pages.

*Primary Examiner* — Jeanette E Chapman
(74) *Attorney, Agent, or Firm* — Cesari & Reed LLP; R. Michael Reed

(57) ABSTRACT

A land drilling rig and associated methods are described that facilitate fast rig up of the drilling rig for drilling a well. In some embodiments, the drilling rig may include a rear trunk, a center trunk, and an alignment frame. The alignment frame may be coupled to an edge of the rear trunk and to an edge of the center trunk during unloading of one of the rear trunk and the center trunk from a trailer to align them during unloading. The drilling rig may be formed form a plurality of components, some of which may be dual purpose structures that store equipment during transit, testing, and rig up and that form a part of the support structure of the drilling rig. Further, base boxes may include moveable feet that can be controlled to walk the base boxes and the drilling rig to a selected location.

20 Claims, 34 Drawing Sheets

(51) Int. Cl.
*E21B 19/14* (2006.01)
*E21B 7/02* (2006.01)
*B65G 67/24* (2006.01)
*E21B 33/06* (2006.01)

(56) References Cited

U.S. PATENT DOCUMENTS

| | | | | |
|---|---|---|---|---|
| 3,483,933 | A * | 12/1969 | Dyer | E21B 15/00 173/39 |
| 3,747,695 | A * | 7/1973 | Branham | E21B 15/00 173/151 |
| 4,578,911 | A * | 4/1986 | Hashimoto | E04H 12/34 52/116 |
| 4,821,816 | A * | 4/1989 | Willis | E21B 15/00 175/57 |
| 5,417,540 | A * | 5/1995 | Cox | B60P 1/6427 414/495 |
| 8,720,128 | B2 * | 5/2014 | Vogt | E21B 15/00 173/28 |
| 8,733,472 | B2 * | 5/2014 | Magnuson | E21B 15/003 166/358 |
| 9,399,890 | B2 * | 7/2016 | Mark | |
| 2004/0211598 | A1 * | 10/2004 | Palidis | E21B 15/00 175/162 |
| 2005/0241823 | A1 * | 11/2005 | Beato | E21B 15/00 166/243 |
| 2009/0321135 | A1 * | 12/2009 | Vora | E21B 15/00 175/57 |
| 2012/0018222 | A1 | 1/2012 | Hankins et al. | |
| 2013/0180186 | A1 | 7/2013 | Konduc et al. | |
| 2013/0269268 | A1 | 10/2013 | Thiessen et al. | |
| 2014/0259985 | A1 * | 9/2014 | Petrello | E04H 12/344 52/115 |
| 2016/0130877 | A1 * | 5/2016 | Fortson | E21B 15/00 52/121 |
| 2017/0101826 | A1 * | 4/2017 | Sigmar | E04H 12/345 |
| 2017/0101833 | A1 * | 4/2017 | Sigmar | E21B 21/01 |

FOREIGN PATENT DOCUMENTS

| | | | | |
|---|---|---|---|---|
| CA | | 2820157 A1 * | 12/2013 | E21B 19/00 |
| CA | | 2838221 A1 * | 6/2015 | E21B 7/023 |
| WO | WO-2015030757 A1 * | | 3/2015 | E21B 7/02 |

* cited by examiner

LAND DRILLING RIG AND METHODS OF ASSEMBLY

CROSS-REFERENCE TO RELATED APPLICATION(S)

The present application is a non-provisional of and claims priority to U.S. Provisional Patent Application No. 62/238,687 filed on Oct. 7, 2015 and entitled "Land Drilling Rig and Methods of Assembly", which is incorporated herein by reference in its entirety.

FIELD

The present disclosure is generally related to land drilling rigs, and more particularly to land drilling rigs and methods of assembly.

BACKGROUND

A drilling rig can be used to drill a wellbore in a formation. Drilling rigs are often large and heavy structures that include equipment that can be used to drill water wells, oil wells, natural gas extraction wells, and the like. Drilling rigs may be broken down into component pieces and loaded onto trucks or trailers for transportation to a next drill site.

Drill rigs may include a mast extending many feet above a substructure supported by the ground. Further, component devices, such the draw-works, the traveling block, the top drive, the pipe handling system, the blow out preventer and other drill rig components add to the weight and introduce complexity to the transportation, rig up and rig down processes. Transportation of the various components can require special travel skids and many tractor trailers.

SUMMARY

In certain embodiments, an efficient pad drilling walking rig is described that can be used for drilling wells, including horizontally deviated wells. In certain embodiments, structural components may provide protection for equipment during transport and during assembly of the rig and may form part of the rig structure. In an example, a first structure may secure traveling equipment during transport and may form a center trunk of the drilling rig. In another example, a second structure may secure a Blow Out Preventer (BOP) during transport and may form a rear trunk of the drilling rig. Further, in certain embodiments, an alignment frame may assist in unloading and aligning trunk components.

In certain embodiments, the base boxes may include lift legs configured to raise up the base box to allow the boxes to unload from the trailers. The base boxes further include movable feet to allow for alignment to the trunk assembly. Further, mast sections may be coupled to the center trunk in a first orientation and the mast may be raised after assembly into a vertical orientation.

In certain embodiments, a pipe racking truss may be coupled to the mast of the drilling rig, and pipe sections may rest on a setback portion of the base boxes and may be secured by the pipe racking truss. By resting the pipe sections on the setback portions of the base boxes, the loads travel through the setback portions to the ground for enhanced stability during drilling and during rig walking operations.

In certain embodiments, an operator may control movable feet in the base boxes to walk a fully assembled drilling rig from a first position to a second position. Further, center portions of the base boxes may be raised to provide sufficient clearance to walk the drilling rig over a wellhead.

A land drilling rig and associated methods are described that facilitate fast rig up of the drilling rig for drilling a well. In some embodiments, the drilling rig may include a rear trunk, a center trunk, and an alignment frame. The alignment frame may be coupled to an edge of the rear trunk and to an edge of the center trunk during unloading of one of the rear trunk and the center trunk from a trailer to align them during unloading. The drilling rig may be formed form a plurality of components, some of which may be dual purpose structures that store equipment during transit, testing, and rig up and that form a part of the support structure of the drilling rig. Further, base boxes may include moveable feet that can be controlled to walk the base boxes and the drilling rig to a selected location.

In some embodiments, a drilling rig can include a rear trunk, a center trunk, and an alignment frame. During unloading of one of the rear trunk and the center trunk from a trailer, the alignment frame can be coupled to an edge of the rear trunk and to an edge of the center trunk to align them.

In some embodiments, a drill rig may include a Driller's Side (DS) base box, an Off Driller's Side (ODS) base box, and a center trunk. The DS base box may include a rear portion, a center portion, and a forward portion. At least the rear portion and the forward portion of the DS base box may include moveable feet actuatable to move the DS base box to a selected location. The ODS base box can include a rear portion, a center portion, and a setback portion. The rear portion and the setback portion can include moveable feet actuatable to move the ODS base box to the selected location. The center trunk may be coupled to the DS base box and the ODS base box and configured to form a base of a mast of a drilling rig. The DS base box and the ODS base box may be controlled to walk the drilling rig to a selected position.

In still other embodiments, a drilling rig can include a plurality of frame elements. At least some of the frame elements may be configured to secure a piece of drilling equipment during storage and during transport and can be configured to form a portion of drill rig structure during operation. The plurality of frame elements can include a first trunk portion configured to secure a blow out preventer (BOP) device during storage and transport and to serve as a rear trunk during operation. The plurality of frame elements can also include a second trunk portion configured to secure traveling equipment during storage and transport and to serve as a center trunk during operation.

BRIEF DESCRIPTION OF THE DRAWINGS

In the following discussion, FIGS. 1-5 and 7-28 generally describe one possible rig up sequence for a land drilling rig. The rig down sequence may proceed in the reverse order, except where deviations may be necessitated by the equipment and/or transportation or other limitations.

In the following discussion, the same reference numbers are used in the various embodiments to indicate the same or similar elements.

DETAILED DESCRIPTION OF ILLUSTRATIVE EMBODIMENTS

Figure 1:
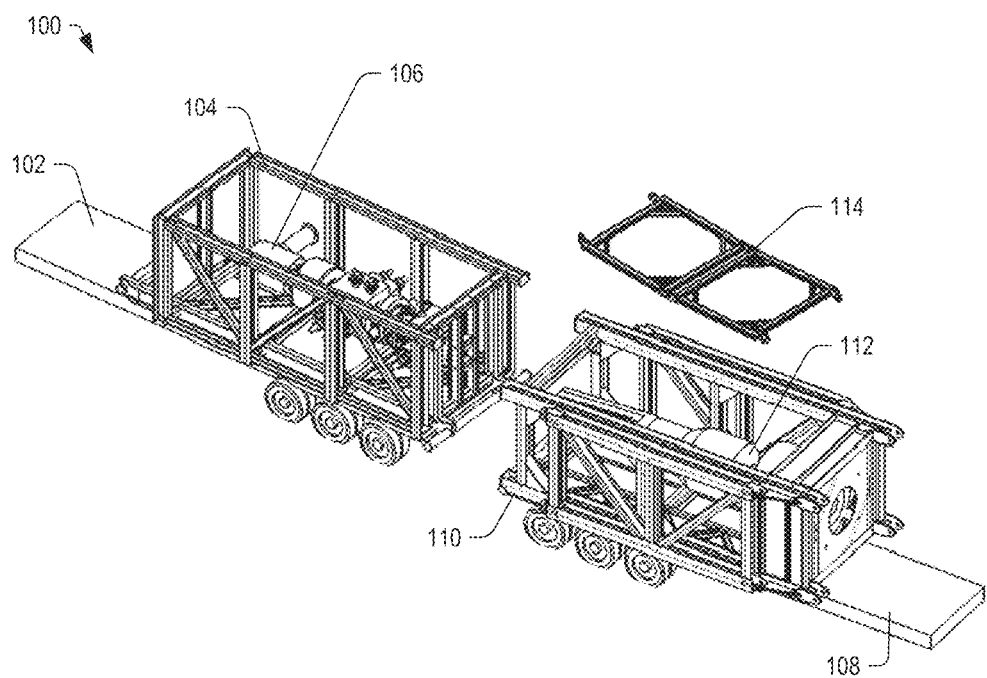
FIG. 1 depicts a perspective view of a plurality of components including a center trunk, a rear trunk, and an alignment frame, which can form a portion of a drilling rig assembly, in accordance with certain embodiments of the present disclosure.

Embodiments of a land drilling rig and associated methods are described below that facilitate fast rig up of the drilling rig for drilling a well. In the following discussion, FIGS. 1-5 and 7-28 generally describe one possible rig up sequence for a land drilling rig. The rig down sequence may proceed in the reverse order, except where deviations may be necessitated by the equipment and/or transportation or other limitations.

In certain embodiments, components of the drilling rig may include mechanical structures as well as drilling equipment. In certain embodiments, one or more of the mechanical structures may secure portions of the drilling equipment during storage and transit and may serve as part of the drilling rig structure as well. In an example, the drill floor may be formed from one or more vertical trunks upon which the drilling mast or derrick can rest. The vertical trunks can be configured to be transported horizontally and to carry some of the drilling rig equipment, such as the blow out preventer (BOP), the top drive, and other equipment that needs a strong shipping package. In certain embodiments, the trunk portions (e.g., center trunk and rear trunk) may be transported to a drill site in a horizontal position and raised into a vertical position to form the substructure assembly.

By utilizing the vertical trunks to form the drill floor, the direct load path of the mast, the rotary loads, or both may travel directly thru the vertical trunk legs to the supporting ground. In certain embodiments, transverse inclined legs or braces can also provide very direct load paths from the mast shoes to the supporting base side boxes. These direct load paths can offer excellent structural strength, can minimize deflections and movements of the structure in all directions, and can provide economical uses of structural steel. In some embodiments, the stability specifications may be fulfilled using boxes or frames that may house fluid containers or tanks, pumps, power systems, or other equipment during storage and transportation and optionally during operation.

Additionally, the vertical trunks that form the drill floor may be utilized as transportation packages for unwieldly mechanical rig equipment, such as the BOP and all or part of the masts traveling equipment, including the top drive. The support, servicing, and operational needs for the transported equipment can be built into the trunk (e.g., tools, parts, spares, testing, and the like), thus eliminating further work and storage areas on the rig. In certain embodiments, one or more of the trunks may include retractable openings into the top or sides for direct access or removal of the stored equipment.

At certain times while drilling a well, the drill string must be pulled out of the well and disconnected in manageable lengths. These drill pipe lengths are called "stands", which are normally stored in an upright position with the lower end resting on the setback areas of the drill floor and the upper ends of these pipe stands are in between fingers of a pipe racking board. In certain embodiments of the present disclosure, the lower end of the drill string can be stored in the setback areas, which can rest on the two front walking feet of the drilling rig, instead of the drill floor. By resting the weight of the drill stands on the walking feet of the rig, the weight of the setback pipe may pass directly from the walking foot into the support mats/bearing ground.

Traditional rig layouts include the setback area on the drill floor, some 20 to 30 feet above the ground. The setback weight load path would flow to the center of the drill floor, out to the topside boxes, down the vertical legs, into the base boxes, in an end to the supporting ground. Thus, by resting the setback pipe on the walking feet, the support steels on the drill floor, legs, and base boxes that was used to support the setback that far up in the air can be eliminated.

Further, the assembly can include a pipe racking truss that can replace a traditional racking board. One of the surfaces of the pipe racking truss can include racking fingers and locks, similar to the traditional racking board. The rest of the volume of the racking board truss can provide a solid, stiff platform for the pipe handling apparatus, which, in one embodiment, can be designed to be retracted into the pipe racking truss when the drilling mast is ready to be lowered, thus forming the pipe handler's own protective shipping and servicing skid. Other embodiments may have the pipe handling apparatus transported to the site and positioned in different ways, using different means, and at different installation timing. In some embodiments, vertical tubular columns may be included near the outboard ends of the pipe racking truss. These columns can be braced on or to the ground or on the walking feet and would greatly decrease deflections in the pipe racking truss.

Further, the base side boxes can be designed to be self-unloading from a trailer, with only power and control lines run to the modules. In an example, the side base boxes may include feet that can be actuated to raise, move, and set down ends of the side boxes to perform a walking motion. Thus, with an operator controlling them, the side base boxes can unload themselves from the transporting trailer or truck, then walk to their correct location, and rest on the projecting raising trunnions. Additionally, the self-unloading jacking system in the side base boxes can also used to raise the center of the substructure to give vertical wellhead clearance while walking the rig. Thus, the substructure can be raised up to provide a ground clearance of three to five feet under the entire drilling rig except for the actuating feet, exceeding the vertical clearance of traditional rigs.

In certain embodiments, the low setback areas on the walking feet plus the pipe handling equipment/pipe racking truss can allow a number of easy methods to perform off-line stand building for the rig. Further, in certain embodiments, an additional pressure intensifier may be integrated within the traveling equipment to provide additional mechanical horsepower in both hydraulic downhole mud flow and available top drive drilling torque.

In the following discussion, the components and associated rig up processes are discussed. Numerous advantages provided through integration of the storage skid and structural assembly components (such as the trunks) may become evident to workers skilled in the art of drilling rig set up in light of the present disclosure. Some aspects, such as cable, hose and valve interconnections are omitted from the following disclosure for ease of discussion.

In the following discussion, the drilling rig components are delivered to a new drill site using trucks and components may be offloaded onto the ground as needed according to the rig up process. In an example, the center trunk and rear trunk may be delivered to the drill site for rig up on flatbed trailers as described below with respect to FIG. 1.

FIG. 1 depicts a perspective view of components 100 including a center trunk 110, a rear trunk 104, and an alignment frame 114, which can form a portion of a land drilling rig, in accordance with certain embodiments of the present disclosure. In the illustrated embodiment, the center trunk 110 may be transported horizontally to a set up area on a flatbed trailer 108. The set up area may be over a desired well location or may be at a nearby location. The center trunk 110 may act as a skid or storage container configured to secure at least some of the traveling equipment, such as a top drive 112. Further, the rear trunk 104 may be transported horizontally to the set up area by a second flatbed trailer 102. The rear trunk 104 may act as a skid or storage container configured to secure additional equipment, such as the blowout preventer (BOP) 106. In certain embodiments, the center trunk 110 and the rear trunk 104 may be formed from structural steel and may include cradle elements or other features configured to couple to and secure the equipment, such as the top drive 112 and the BOP 106. Further, in some embodiments, the center trunk 110 and the rear trunk 104 may include a moving system configured to facilitate positioning of the BOP 106. The center trunk 110 may further include operational support and service access for the BOP 106.

Additionally, the alignment frame 114 may be formed from structural steel. The alignment frame 114 may include a hinged center portion and may include end portions configured to engage features of the rear trunk 104 and the center trunk 110. In certain embodiments, the alignment frame 114 may be coupled to one or both of the rear trunk 104 and the center trunk 110 before unloading from their respective flatbed trailers 102 and 108 onto the ground.

In an example, the rear trunk 104 may be unloaded onto the ground. A first end of the alignment frame 114 may be coupled to a feature of the rear trunk. The center trunk 110 may be transported using the trailer into a position adjacent to the rear trunk 104. The second end of the alignment frame 114 may be coupled to a feature of the center trunk 110. The trailer 108 may be moved, and the weight of the rear trunk 104 and the coupling of the alignment frame 114 may pull the center trunk 110 off of the trailer 108 and onto the ground in alignment with the rear trunk 104. In other embodiments, the rear trunk 104 and the center trunk 110 may be connected to the alignment frame 114 while they are still loaded on the trailers 102 and 108. The rear trunk 104 and the center trunk 110 may then be unloaded onto the ground in a desired sequence. In still other embodiments, the center trunk 110 may be unloaded first and the alignment frame 114 may be coupled to the center trunk 110 and the rear trunk 104 before the rear trunk 104 is unloaded.

The alignment frame 114 operates to secure the rear trunk 104 and the center trunk 110 at a desired spacing and with a desired alignment to facilitate the rig up process. One possible example of the use of the alignment frame 114 is described below with respect to FIG. 2.

Figure 2:
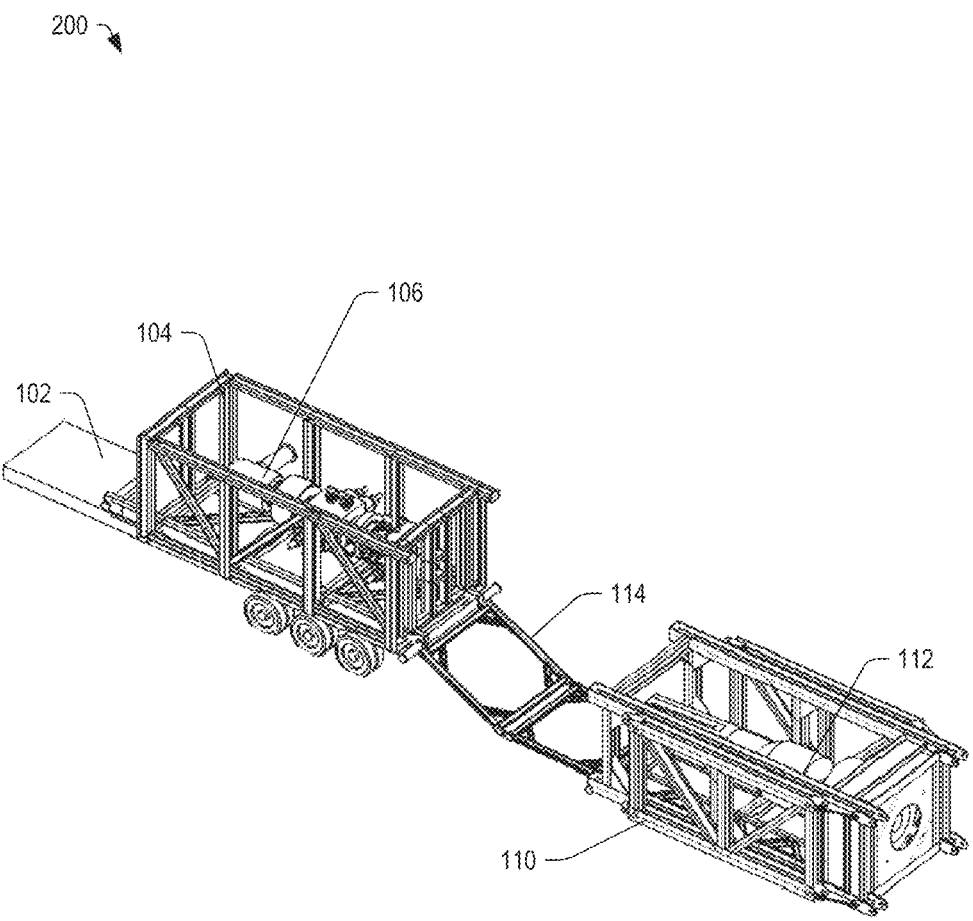
FIG. 2 depicts a perspective view of the components of FIG. 1 with the center and rear trunks coupled to the alignment frame and with the center trunk offloaded from the flatbed trailer, in accordance with certain embodiments of the present disclosure.

FIG. 2 depicts a perspective view 200 of the assembly 100 of FIG. 1 with the center trunk 110 and the rear trunk 104 coupled to the alignment frame 114 and with the center trunk 110 unloaded from the flatbed trailer 102 onto the ground, in accordance with certain embodiments of the present disclosure. In certain embodiments, the center trunk 110 may be unloaded horizontally and coupled to the alignment frame 114 (either before or after unloading). The other end of the alignment frame 114 may then be coupled to the rear trunk 104. The alignment frame 114 may then assist in the unloading of the rear trunk 104 onto the ground while maintaining the end of the rear trunk 104 in alignment with the end of the center trunk 110.

In certain embodiments, the alignment frame 114 may include a hinge-like element with a rod or pin that can be slid through corresponding elements of the center trunk 110 and the rear trunk 104 to form attachments and a hinged feature. In certain embodiments, the rear trunk 104 and the center trunk 110 may be configured to pivot about the hinged portions into vertical orientations that can form the base of the mast of the drilling rig.

Figure 3:
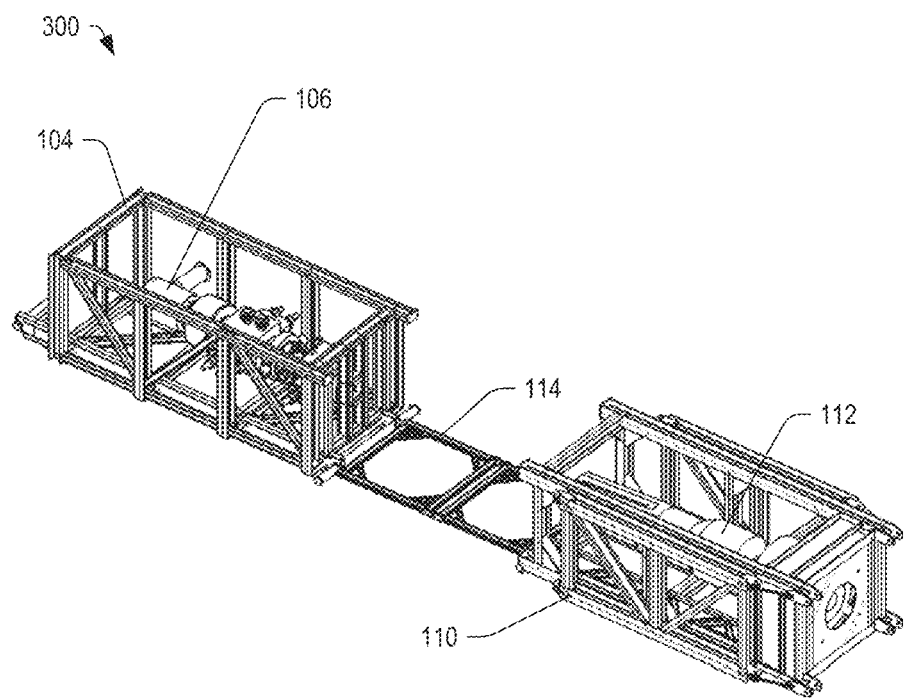
FIG. 3 depicts a perspective view of the components of FIG. 2 with the center and rear trunks offloaded and forming a trunk assembly, in accordance with certain embodiments of the present disclosure.

FIG. 3 depicts a perspective view of the assembly 100 of FIG. 2 with the center trunk 110 and the rear trunk 104 offloaded onto the ground and forming a trunk assembly 300, in accordance with certain embodiments of the present disclosure. In certain embodiments, the alignment frame 114 ensures that, when they are stood up vertically, the center trunk 110 and the rear trunk 104 are in alignment. Further, the alignment frame 114 maintains spacing of the center trunk 110 relative to the rear trunk 104 so that the trunks may be stood up into a vertical orientation without altering the alignment.

Figure 4:
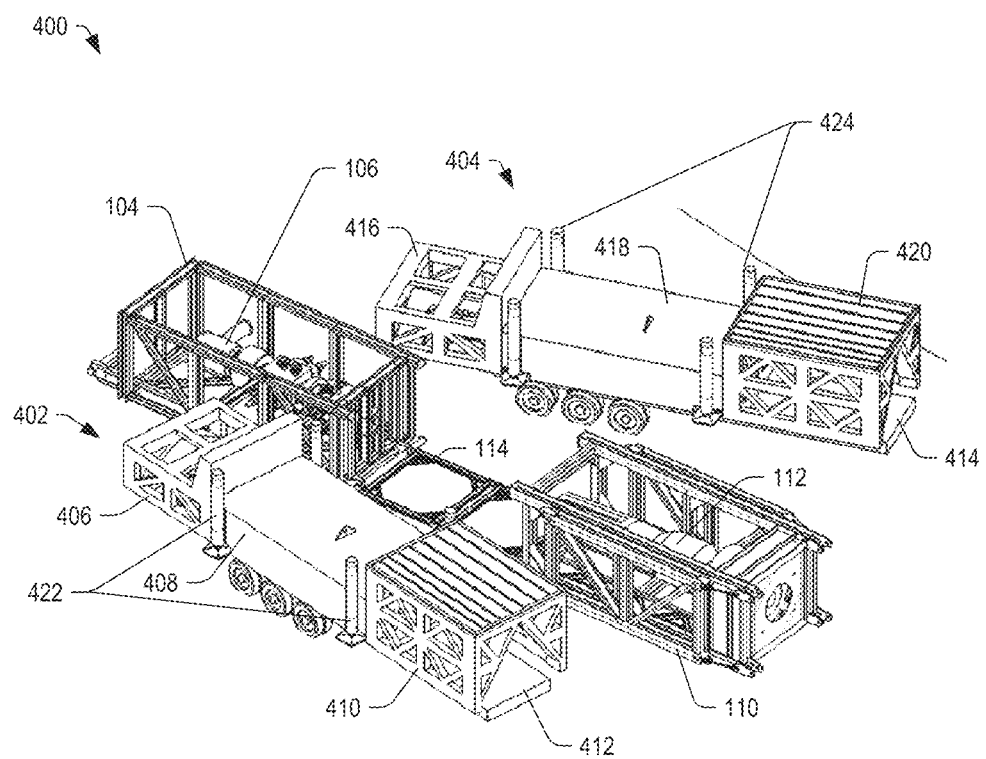
FIG. 4 depicts a perspective view of the components of FIG. 3 including the trunk assembly, a driller's side (DS) base box, and an off driller's side (ODS) base box, in accordance with certain embodiments of the present disclosure.

FIG. 4 depicts a perspective view 400 of the assembly of FIG. 3 including the trunk assembly 300, a driller's side (DS) base box 402, and an off driller's side (ODS) base box 404, in accordance with certain embodiments of the present disclosure. The base box 402 includes a rear portion 406, a center portion 408, and a forward portion 410. The base box 402 may be transported on a flatbed trailer 412. Similarly, the base box 404 may include a rear portion 416, a center portion 418, and a forward portion 420 and may be transported on a flatbed trailer 414. In certain embodiments, the base box 402 and the base box 404 include lift cylinders 422 and 424, respectively, which can be used to raise the base boxes 402 and 404 to unload them from their trailers 412 and 414. Then, the lift cylinders 422 and 424 can lower the base boxes 402 and 404 to the ground where their walking systems can walk them and position them as required. By utilizing such lift cylinders 422 and 424 for unloading, the components may be unloaded onto the ground without cranes or other moving equipment.

In other embodiments, the lift cylinders 422 and 424 may be omitted, and the center portions 408 and 418 may be raised above the ground to provide a clearance of between three feet and six feet. A top surface of the center portions 408 and 418 may be substantially even with a top surface of the forward portions 410 and 420.

In certain embodiments, the rear portions 406 and 416 may include movable feet and the forward portions 410 and 420 may include movable feet. The movable feet may be coupled to a plurality of actuating elements, which may be hydraulic, pneumatic, electrical, or any combination thereof. In certain embodiments, the actuating elements may be controlled electronically to walk the base box 402 and the base box 404 into position adjacent to the trunk assembly 300 (i.e., the rear trunk 104 coupled to the center trunk 110 via the alignment frame 114).

Figure 5:
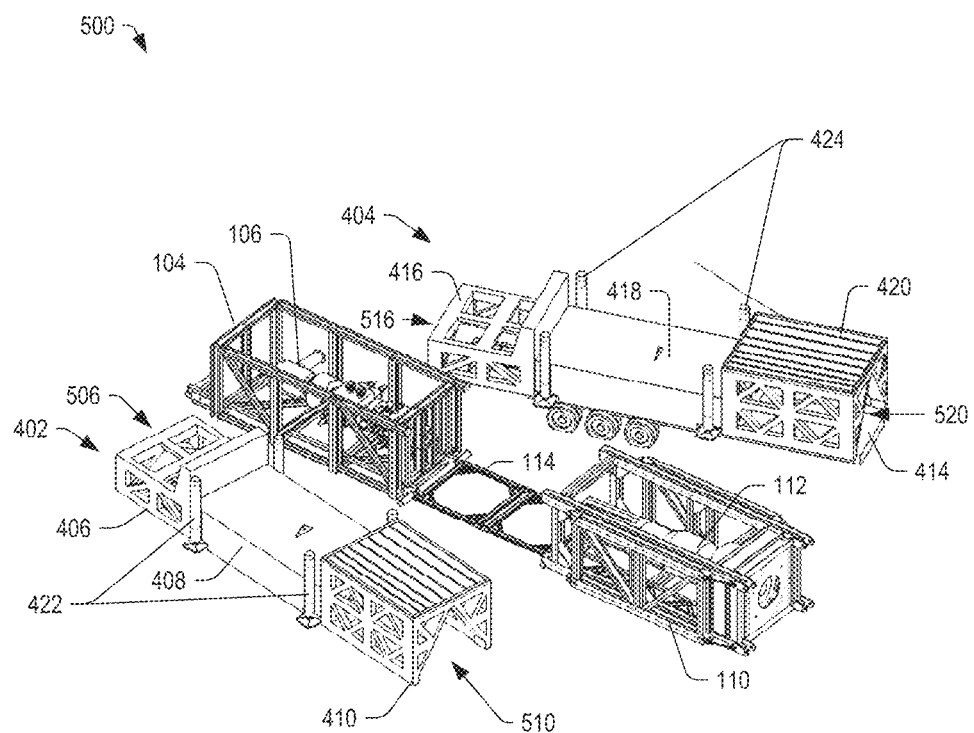
FIG. 5 depicts a perspective view of the components of FIG. 4 including the trunk assembly, the base boxes, where the DS base box is offloaded, in accordance with certain embodiments of the present disclosure.

FIG. 5 depicts a perspective view 500 of the assembly of FIG. 4 including the trunk assembly 300, the base box 402 and the base box 404, where the base box 402 has been offloaded from the flatbed trailer 412 onto the ground, in accordance with certain embodiments of the present disclosure. As previously mentioned, the base box 402 may include movable feet, generally indicated at 506 and 510 (shown in FIGS. 24 and 34 and described with respect to feet 606 in FIG. 6), which feet may be controlled to move the base box 402 into position adjacent to the trunk assembly 300. In certain embodiments, the base box 402 may be coupled to a power supply and to a control system via electrical connections (not shown). In certain embodiments, an operator may interact with the control system to control the feet to walk the base box 402 into position.

Figure 6:
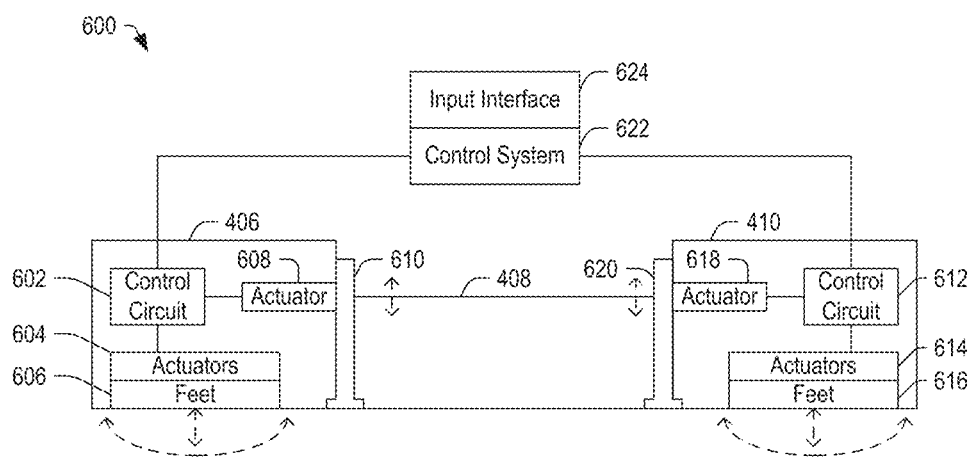
FIG. 6 depicts a block diagram of an actuating system configured to move the DS base box and the ODS base box into a selected position, in accordance with certain embodiments of the present disclosure.
Figure 24:
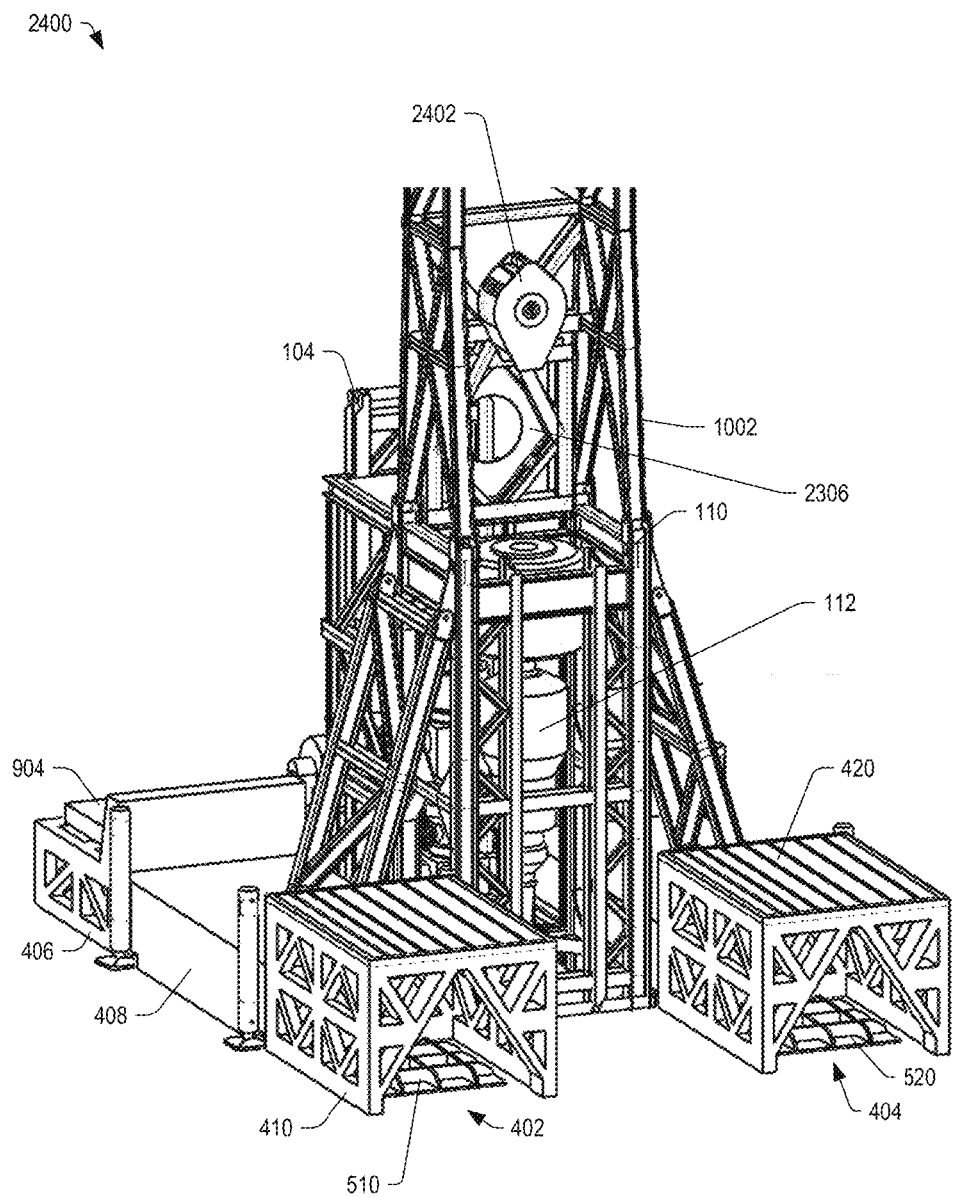
FIG. 24 depicts a perspective view of the partially rigged up land drilling rig of FIG. 23 with the drill floor raised and with the traveling block about to be coupled to the top drive, in accordance with certain embodiments of the present disclosure.
Figure 34:
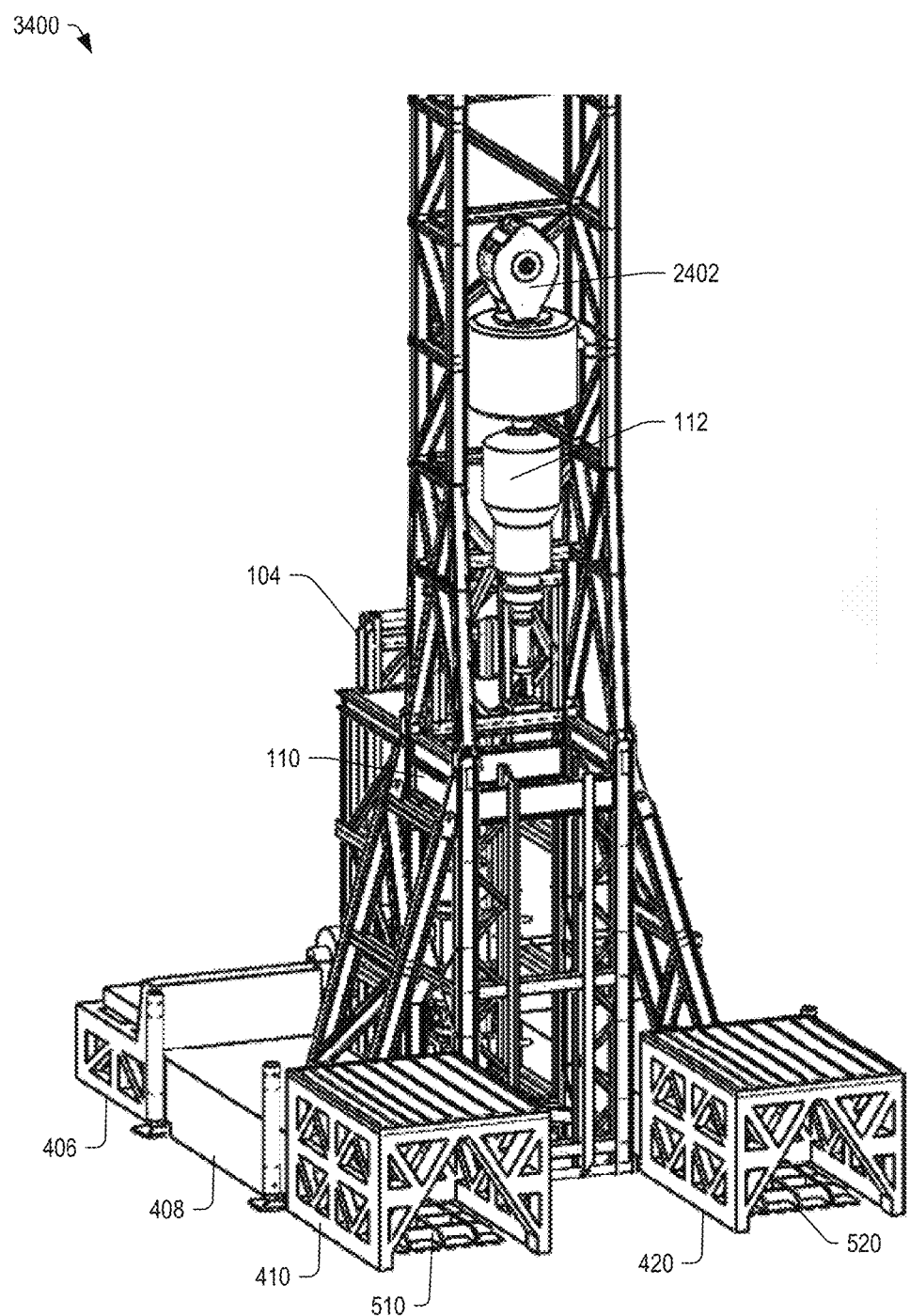
FIG. 34 depicts a front perspective view of the drilling rig of FIG. 30, in accordance with certain embodiments of the present disclosure.

Similarly, the base box 404 may include movable feet, generally indicated at 516 and 520 (shown in FIGS. 24 and 34 and described with respect to feet 616 in FIG. 6). The base box 404 may also be coupled to a power supply and to a control system via electrical connections (not shown). In certain embodiments, an operator may interact with the control system to control the feet to walk the base box 404 into position. In certain embodiments, the control system may be used to unload the base box 402 and the base box 404 from the flatbed trailers 412 and 414, respectively.

FIG. 6 depicts a block diagram of an actuating system 600 configured to move the base boxes into a selected position, in accordance with certain embodiments of the present disclosure. The system 600 may include the base box 402 including the rear portion 406, the center portion 408, and the forward portion 410. In the rear portion 406, the system 600 may include a control circuit 602 coupled to a plurality of actuators 604 coupled to one or more movable feet 606. The control circuit 602 may also be coupled to one or more actuators 608, which may be coupled to one or more legs 610 adjacent to the rear portion 406.

The forward portion 410 may include a control circuit 612 coupled to one or more actuators 614 coupled to one or more movable feet 616. The control circuit 612 may also be coupled to actuators 618, which may be coupled to one or more legs 620 adjacent to the setback portion 410.

In certain embodiments, the actuating system 600 may further include a control system 622 coupled to an input interface 624 and coupled to the control circuits 602 and 612. An operator may interact with the control system 622 via the input interface 624 to control operation of the control circuits 602 in order to concurrently control the actuators 604 and 614 in order to walk the base box 402 into position. In some embodiments, the input interface 624 can include a hand-held control element, such as a joystick or other controller. The base box 404 can include control circuits, actuators, and legs as well. Further, in certain embodiments, the control system 622 may be configured to coordinate movement of the base box 402 and the base box 404 simultaneously.

It should be appreciated that each base box 402 and 404 may include multiple movable feet and associated actuators and legs. Further, depending on the implementation, movable feet and associated structures may be added to provide a desired level of mobility and to manage the weight being transported. While two feet 606 are shown, at least four feet 606 are likely to be included and more are possible.

Figure 7:
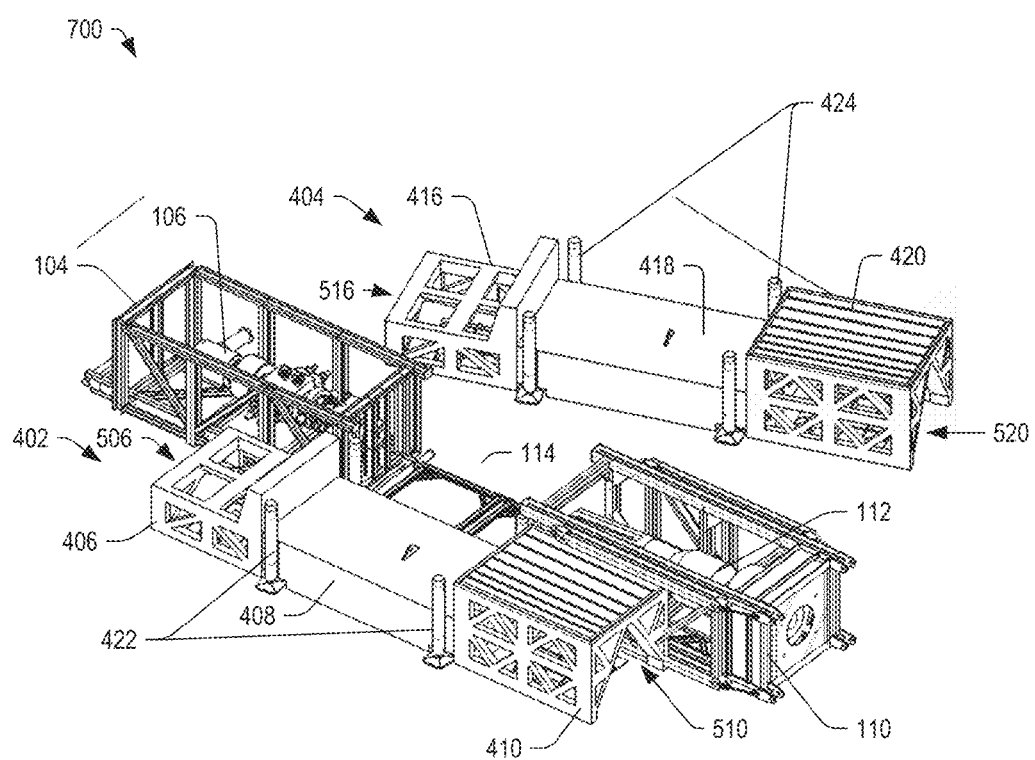
FIG. 7 depicts a perspective view of the components of FIG. 5 with the ODS base box offloaded and the DS base box walked into position, in accordance with certain embodiments of the present disclosure.

FIG. 7 depicts a perspective view 700 of the components of FIG. 5 with the base box 404 offloaded onto the ground, in accordance with certain embodiments of the present disclosure. In the illustrated example, the base box 402 has been "walked" into position adjacent to the trunk assembly using the legs 606 and 616 in FIG. 6. The operator may then couple the base box 404 to the control system 622 and may walk the base box 404 into position on the ODS side of the drill rig.

Figure 8:
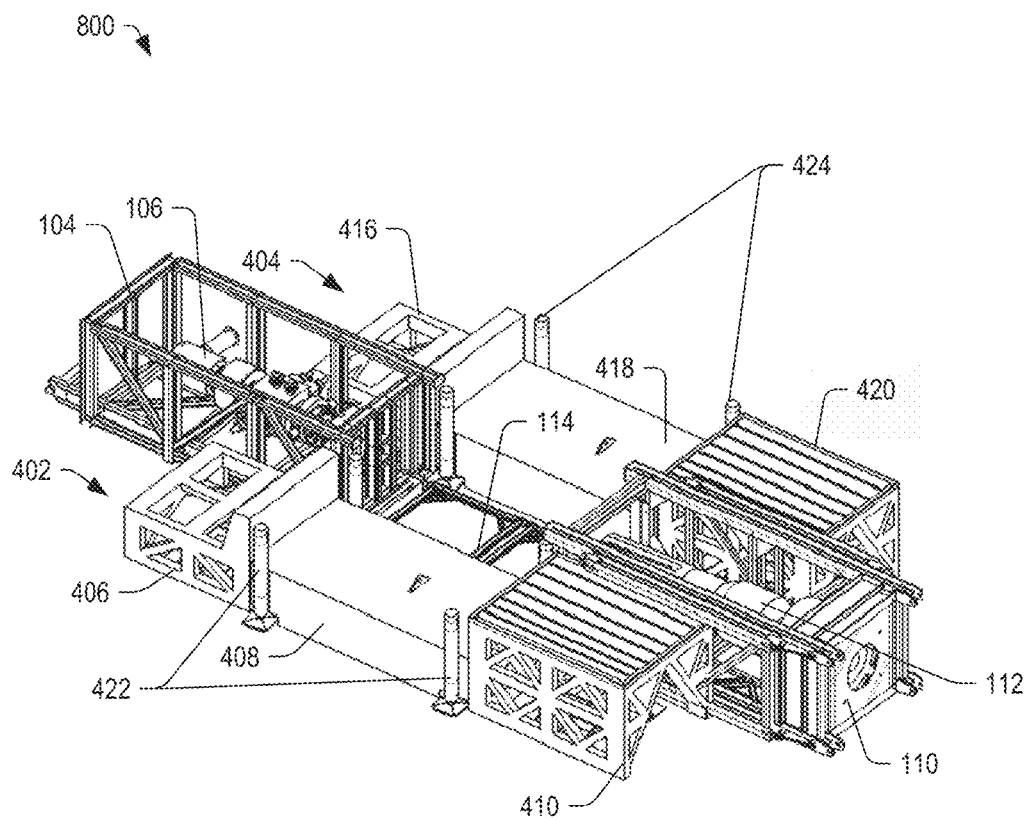
FIG. 8 depicts a perspective view of the components of FIG. 7 after walking the ODS base box into position adjacent to the trunk assembly, in accordance with certain embodiments of the present disclosure.

FIG. 8 depicts a perspective view 800 of the components of FIG. 7 after walking the base box 404 into position adjacent to the trunk assembly 300, in accordance with certain embodiments of the present disclosure. As discussed above, the base box 404 includes feet, a control circuit, and actuators that may operate to walk the base box 404 into position adjacent to the trunk assembly 300.

Once the base boxes 402 and 404 are coupled to the rear trunk 104 and the center trunk 110, the rear trunk 104 may be pivoted along its connection to the alignment frame 114 into a vertical orientation. One example of the components showing the rear trunk 104 in a vertical position is described below with respect to FIG. 9.

Figure 9:
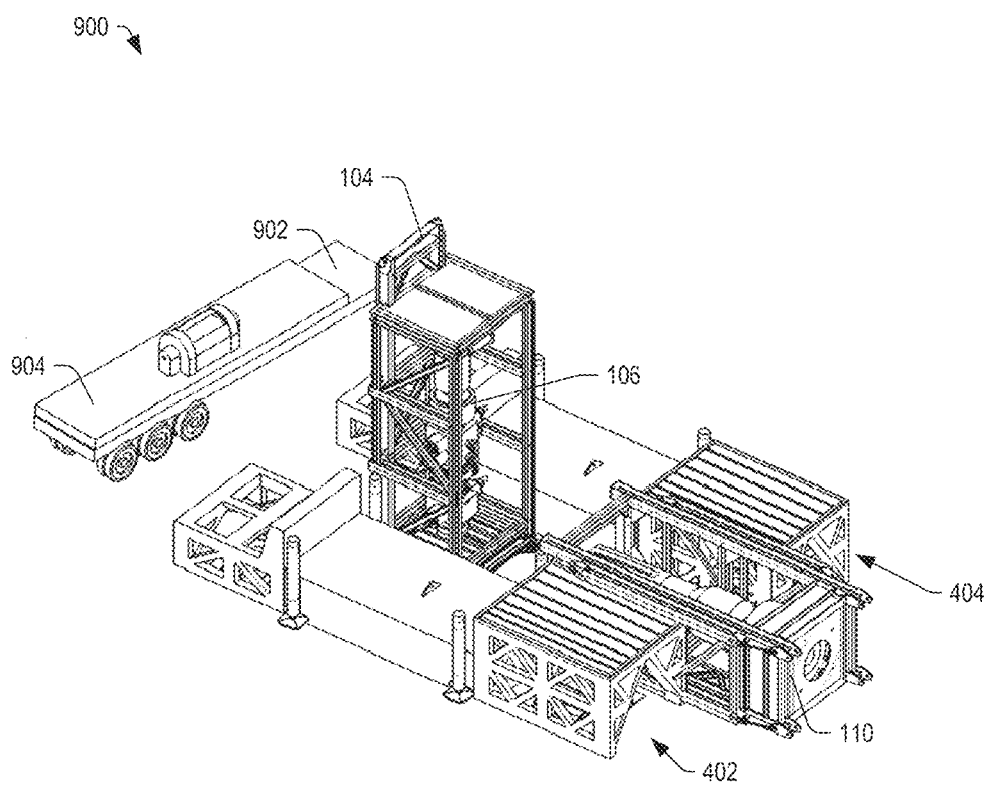
FIG. 9 depicts a perspective view of the components of FIG. 8 including the rear trunk raised to a vertical position and including a drawworks skid being transported into position near the drawworks ends of the base boxes, in accordance with certain embodiments of the present disclosure.

FIG. 9 depicts a perspective view 900 of the assembly of FIG. 8 including the rear trunk 104 raised to a vertical position and including a drawworks skid 904 being transported into position near the rear portions 406 and 416 of the base box 402 and base box 404, in accordance with certain embodiments of the present disclosure. In certain embodiments, the rear trunk 104 can be coupled to the alignment frame and can be raised to its vertical orientation by pivoting about an axis defined by the connection between the alignment frame 114 and the rear trunk 104. Once raised, the rear trunk 104 may be pinned to the base box 402 and the base box 404.

The drawworks skid 904 may be transported horizontally on a flatbed trailer 902 and may be positioned near the rear portions of the base boxes 402 and 404. Once in position, the drawworks skid 904 may be drawn onto or slid across and pinned to the rear portions 406 and 416 of the base boxes 402 and 404.

Figure 10:
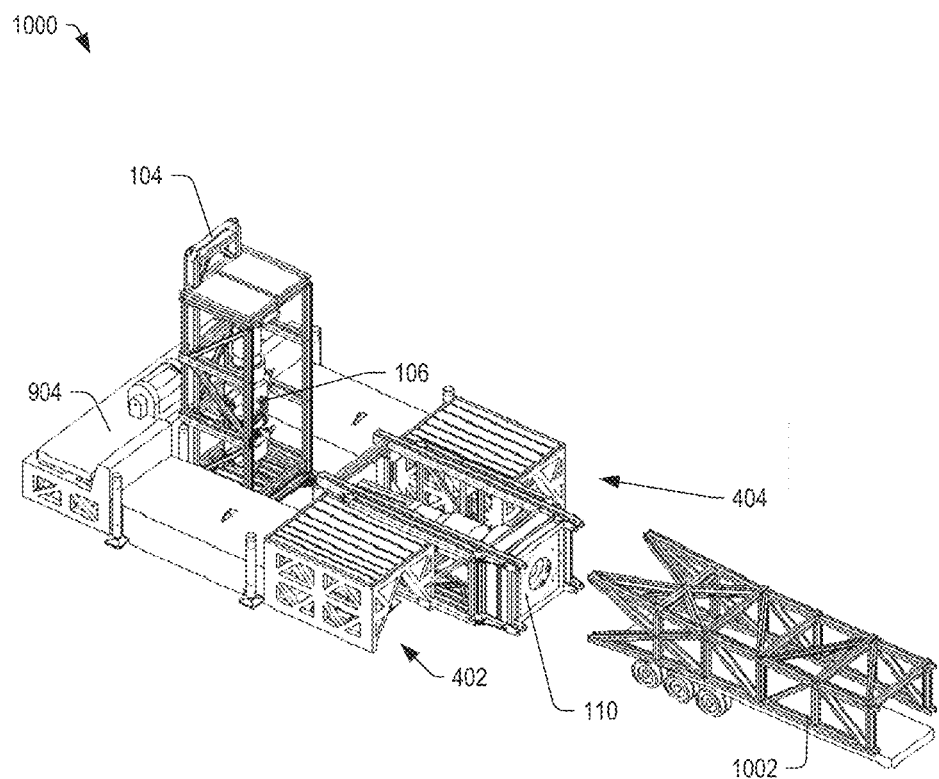
FIG. 10 depicts a perspective view of the components of FIG. 9 including a bottom mast section being moved into alignment with an end of the center trunk, in accordance with certain embodiments of the present disclosure.

FIG. 10 depicts a perspective view 1000 of the components of FIG. 9 including a bottom mast section 1002 being moved via a flatbed trailer into alignment with an end of the center trunk 110, in accordance with certain embodiments of the present disclosure. In the illustrated example, the drawworks skid 904 may be coupled to the rear portions 406 and 416 of the base box 402 and the base box 404. The bottom mast portion 1002 may be moved into position adjacent to the center trunk 110 and may be connected to the center trunk 110 at connection points that can be readily accessed by a worker standing on the ground or on a ladder. In certain embodiments, ladder-type elements may be incorporated into the sides of at least one of the center trunk 110 and the bottom mast portion 1002 to facilitate the assembly. In some embodiments, the center trunk 110 may be raised slightly to align the center trunk 110 to the bottom mast section 1002.

Figure 11:
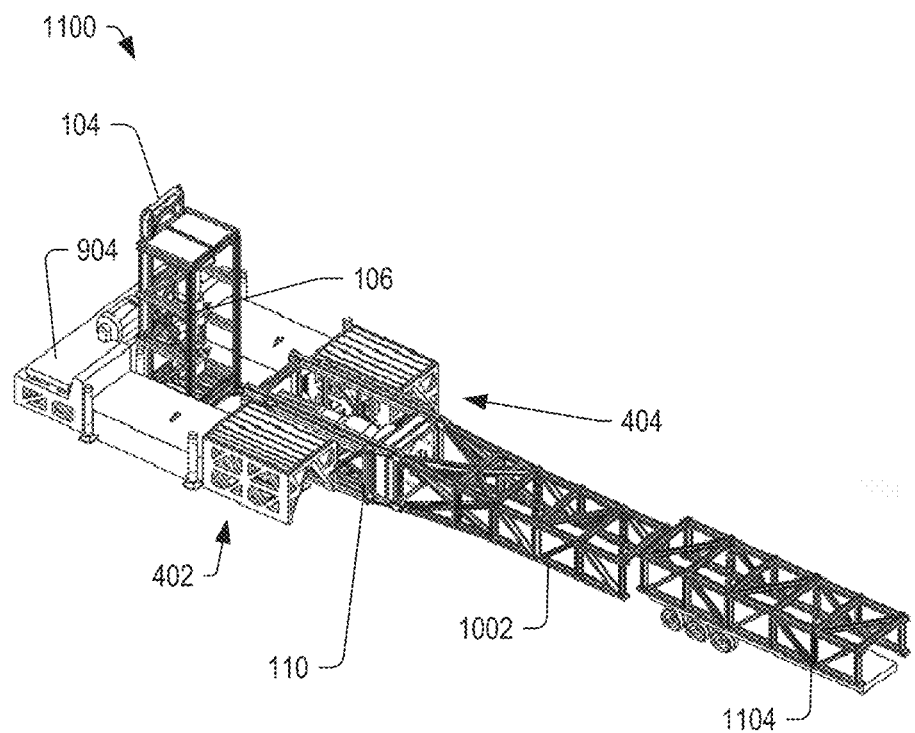
FIG. 11 depicts a perspective view of the components of FIG. 10 including a lower intermediate mast section being moved into alignment with an end of the bottom mast section, in accordance with certain embodiments of the present disclosure.

FIG. 11 depicts a perspective view 1100 of the components of FIG. 10 including a lower intermediate mast section 1104 being moved using a flatbed trailer into alignment with an end of the bottom mast section 1002, in accordance with certain embodiments of the present disclosure. The connections between the lower intermediate mast section 1104 and the bottom mast section 1002 may be completed while the mast sections are near the ground so that they can be readily accessed by a worker standing on the ground or on a ladder. In certain embodiments, ladder-type elements may be incorporated into the sides of at least one of the bottom mast portion 1002 and the lower intermediate mast section 1104 to facilitate the assembly.

Further, in some embodiments, the lower intermediate mast section 1104 may house one or more actuators (not shown) that can be configured to raise the mast to enable installation of a pipe racking truss and to improve the geometry to enable further mast raising. By utilizing actuators to raise the lower intermediate mast section 1104 and the bottom mast section 1002 (by virtue of their being interconnected), the pipe racking truss and associated machinery may be installed in a safe and controlled manner, while the lower intermediate mast section 1104 can be at a low mast angle.

Figure 12:
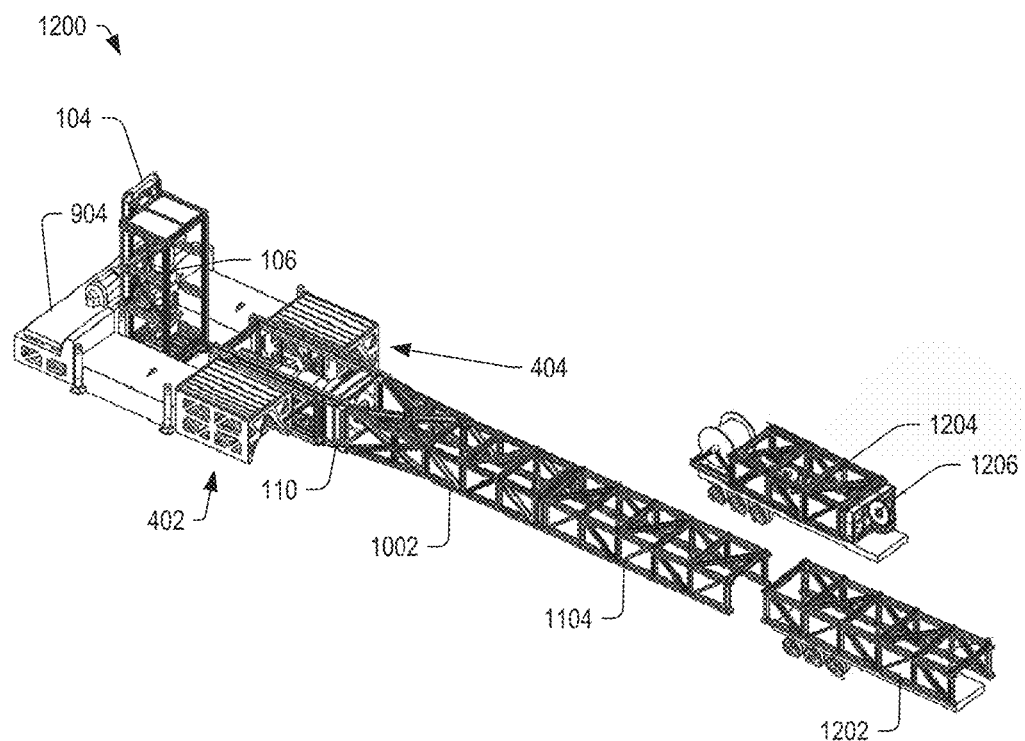
FIG. 12 depicts a perspective view of the components of FIG. 11 including an upper intermediate mast section and a top mast section being moved into alignment with an end of the lower intermediate mast section, in accordance with certain embodiments of the present disclosure.

FIG. 12 depicts a perspective view 1200 of the components of FIG. 11 including an upper intermediate mast section 1202 and a top mast section 1204 being moved into alignment with an end of the lower intermediate mast section 1104, in accordance with certain embodiments of the present disclosure. The upper intermediate mast section 1202 and the top mast section 1204 may be moved into alignment with the lower intermediate mast section 1104 using flatbed trailers. Then, the upper intermediate mast section 1202 can be pinned or bolted to the lower intermediate mast section 1104, and the top mast section 1204 may be pinned or bolted to the upper intermediate mast section 1202. The top mast section 1204 may include the crown 1206. Further, the traveling block may be stored within the top mast section 1204 during transit and the drill line reel may be moved on the same trailer.

Figure 13:
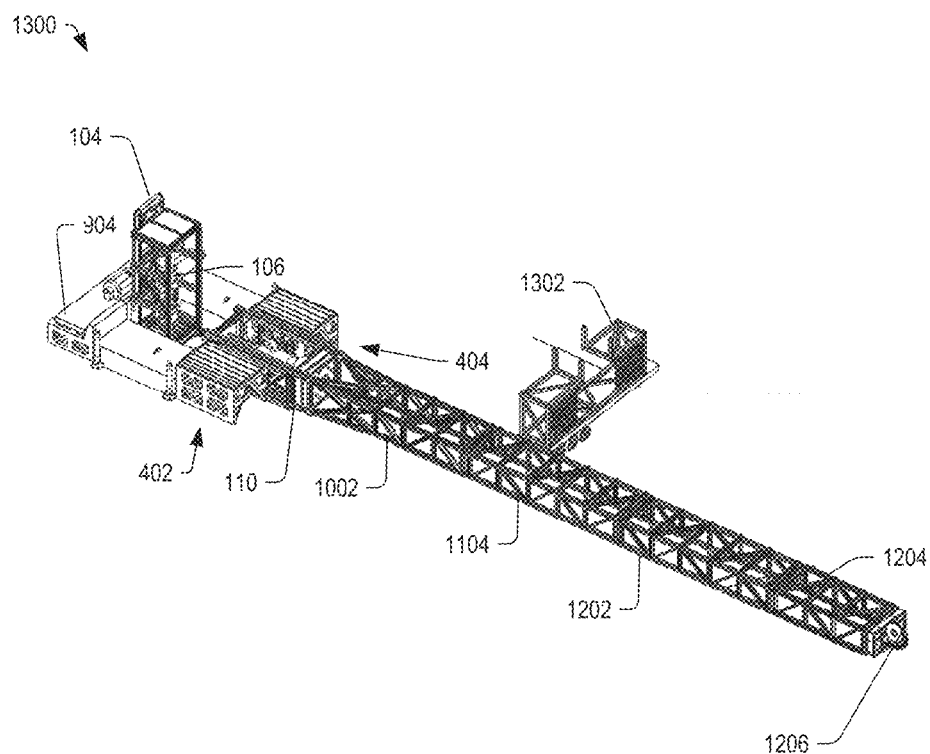
FIG. 13 depicts a perspective view of the components of FIG. 12 including a pipe racking truss being moved into position near the bottom mast section and lower intermediate mast sections, in accordance with certain embodiments of the present disclosure.

FIG. 13 depicts a perspective view 1300 of the components of FIG. 12 including a pipe racking truss 1302 being moved on a flatbed trailer into position near the bottom mast section 1002 and the lower intermediate mast section 1104, in accordance with certain embodiments of the present disclosure. The pipe racking truss 1302 can replace a traditional racking board. In certain embodiments, one of the surfaces of the pipe racking truss 1302 can include racking fingers and locks, similar to the traditional racking board, and configured to retain the upper end of the stand. The rest of the volume of the racking board truss 1302 can provide a solid, stiff platform for a pipe handling apparatus, which can be designed to be retracted into the pipe racking truss when the drilling mast is ready to be lowered. In certain embodiments, the pipe racking truss 1302 may be used as a storage skid for pipe racking equipment during storage and transit and for servicing. Thus, the pipe racking truss 1302 can also serve as a protective-shipping and servicing skid for the pipe handler. While the pipe racking truss 1302 is shown being attached to the mast before the mast is raised, in some embodiments, the pipe handling apparatus may be transported to the site and positioned in different ways, using different means, and at different installation timing.

In some embodiments, vertical tubular columns may be included near the outboard ends of the pipe racking truss 1302. The columns may be installed after the mast is raised or may be installed as part of the mast raising process. These columns can be braced on the ground or on the forward portions 410 and 420 of the base boxes and can decrease deflections in the pipe racking truss 1302 and increase stability of the system, including stability of the mast.

Figure 14:
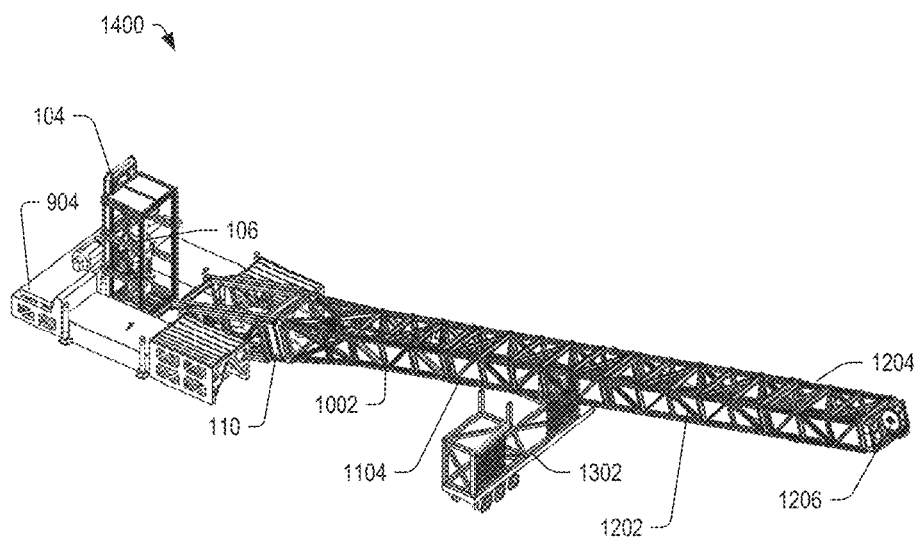
FIG. 14 depicts a perspective view of the components of FIG. 13 with the mast partially raised to facilitate attachment of the pipe racking truss to a portion of the mast, in accordance with certain embodiments of the present disclosure.

FIG. 14 depicts a perspective view 1400 of the components of FIG. 13 with the mast (formed of the center trunk 110, the bottom mast portion 1002, the lower intermediate mast section 1104, the upper intermediate mast section 1202, and the top mast section 1204) partially raised to facilitate attachment of the pipe racking truss 1302 to a portion of the mast, in accordance with certain embodiments of the present disclosure. In some embodiments, ladder-like structures may be included on the top mast section 1204 and on the upper intermediate mast portion 1202 to facilitate the assembly process.

As mentioned above, actuators may be provided in the lower intermediate mast section 1104, which may be used to raise and lower the lower intermediate mast section 1104, the bottom mast section 1002 and other associated mast sections to facilitate installation of the pipe racking truss 1302 and associated pipe racking equipment. Further, raising the mast components slightly improves the geometry for further mast raising in a safe and a controlled manner. In a particular example, machinery associated with the drawworks skid 904 may be coupled to the lower intermediate mast section 1104 or to another portion of the mast and used to raise the mast to a vertical state in a safe and controlled manner. The actuators may be used to raise the lower intermediate mast section 1104 to facilitate the raising of the mast to the vertical state.

Figure 15:
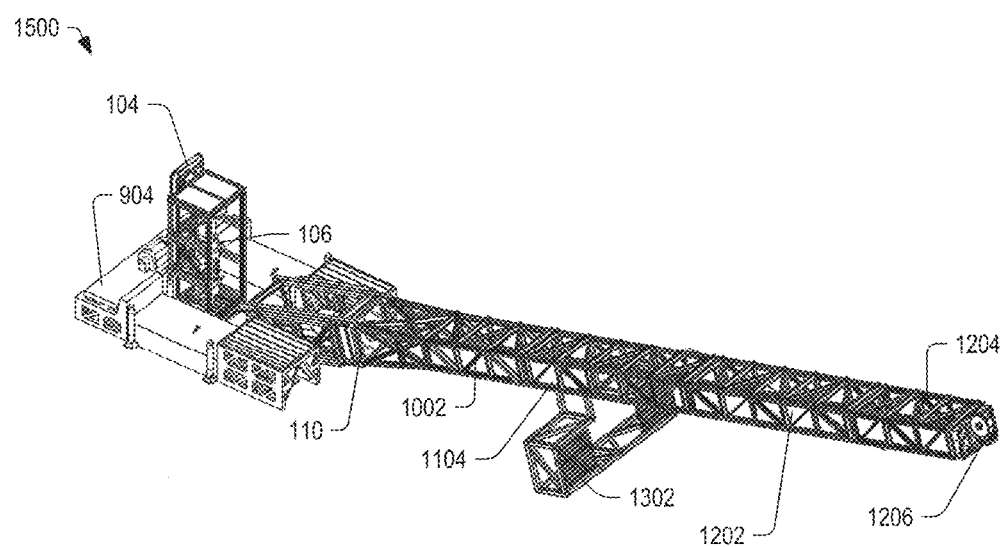
FIG. 15 depicts a perspective view of the components of FIG. 14 with the pipe racking truss attached and the mast partially raised, in accordance with certain embodiments of the present disclosure.

FIG. 15 depicts a perspective view 1500 of the assembly of FIG. 14 with the pipe racking truss 1302 attached and with the mast partially raised, in accordance with certain embodiments of the present disclosure. As mentioned above, one or more actuators may be provided within the lower intermediate mast section 1104, which may be used to at least partially raise the mast assembly to facilitate installation of the racking truss 1302.

In one possible example, in this position, cables may be run from the drawworks skid 904 over the rear trunk 1104 to the lower intermediate mast section 1104 or to another section of the mast assembly. A winch or other motorized mechanism may then pull the cables to draw the mast from its partially raised position to the vertical position. By at least partially raising the mast using one or more actuators within the mast, the amount of tension required to raise the mast may be reduced, allowing the mast to be more easily raised in a safe and controlled manner.

Figure 16:
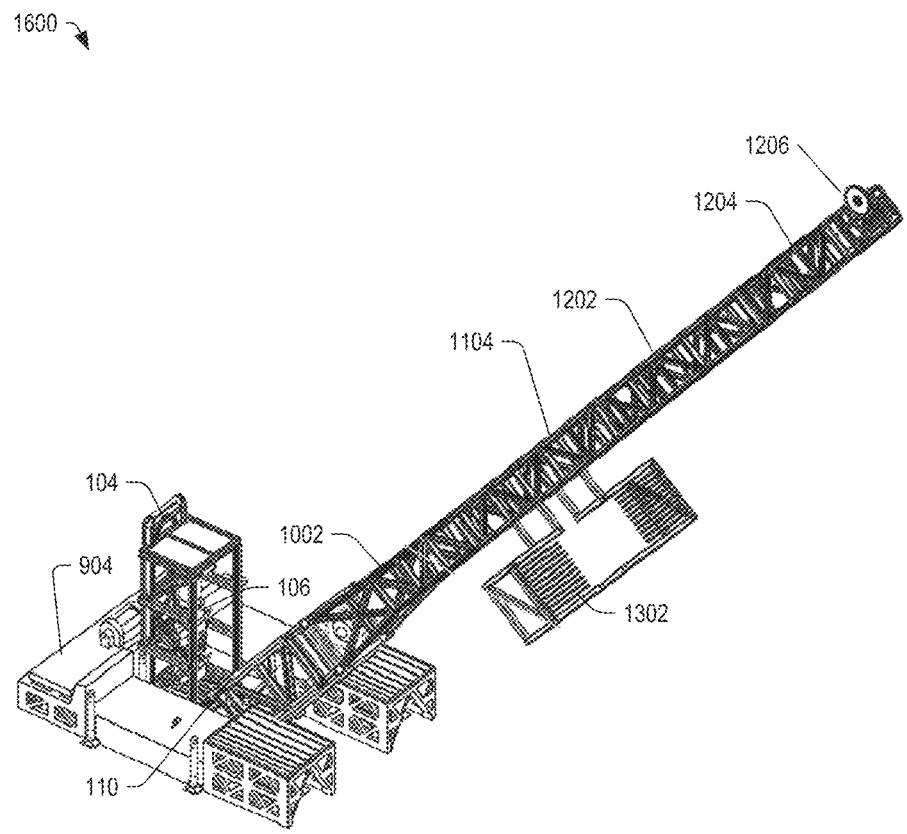
FIG. 16 depicts a perspective view of the components of FIG. 15 with the mast raised approximately forty-five degrees, in accordance with certain embodiments of the present disclosure.

FIG. 16 depicts a perspective view 1600 of the assembly of FIG. 15 with the mast raised approximately forty-five degrees, in accordance with certain embodiments of the present disclosure. As mentioned with respect to FIG. 15, a cable (not shown) may couple a winch on the drawworks skid 904 to the mast, such as to the lower intermediate mast section 1104, and may be used to pull the mast toward the upright state. Further, in some embodiments, one or more actuators may be included at a base of the center trunk 110 and may be configured to engage one of the rear trunk 104 and the base boxes 402 and 404 to slow or otherwise control the final few feet of the raising and lowering operations. At a later time, such as when the rig is being disassembled, the same actuators may be used to assist in the lowering of the mast by raising one edge of the mast to cause it to begin tilting. Other embodiments are also possible.

Figure 17:
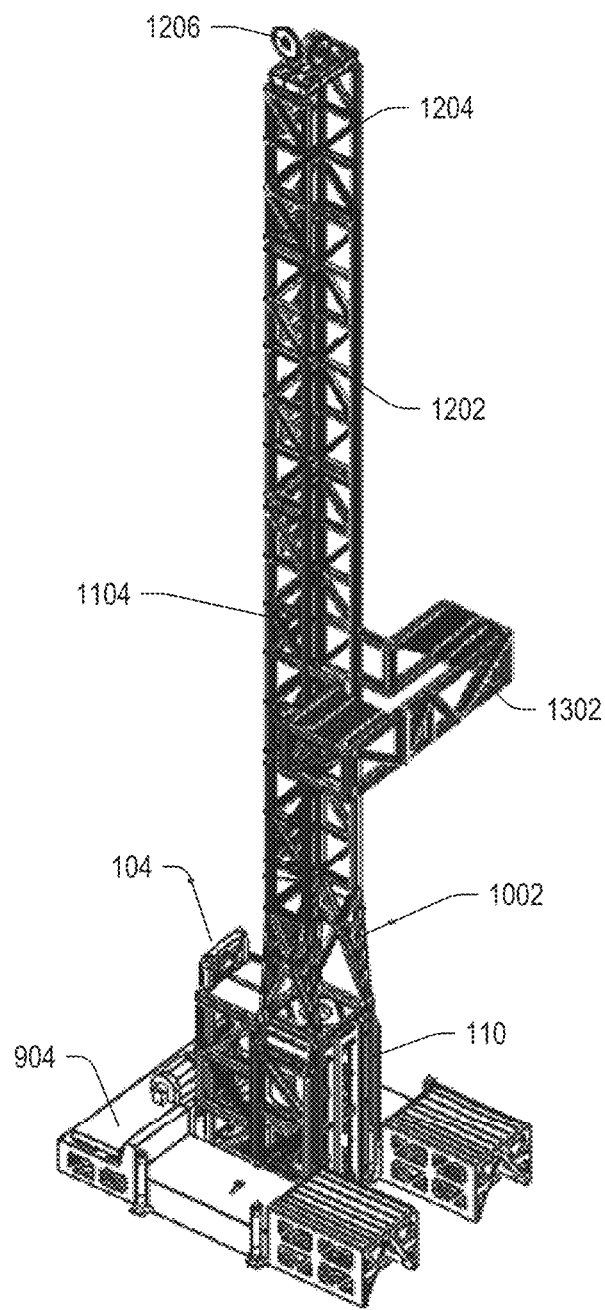
FIG. 17 depicts a perspective view of the components of FIG. 16 with the mast raised to its operating position, in accordance with certain embodiments of the present disclosure.

FIG. 17 depicts a perspective view 1700 of the assembly of FIG. 16 with the mast raised to its operating position (vertical), in accordance with certain embodiments of the present disclosure. Once raised, the center trunk 110 may be pinned to the rear trunk 104 and to the base box 402 and the base box 404. Additionally, as discussed above, in certain embodiments, vertical tubular columns (not shown) may be included near the outboard ends of the pipe racking truss 1302. These columns can be braced on the ground or on the forward portions 410 and 420 of the base boxes 402 and 404 and can decrease deflections in the pipe racking truss 1302 and increase stability of the system, including stability of the mast.

Figure 18:
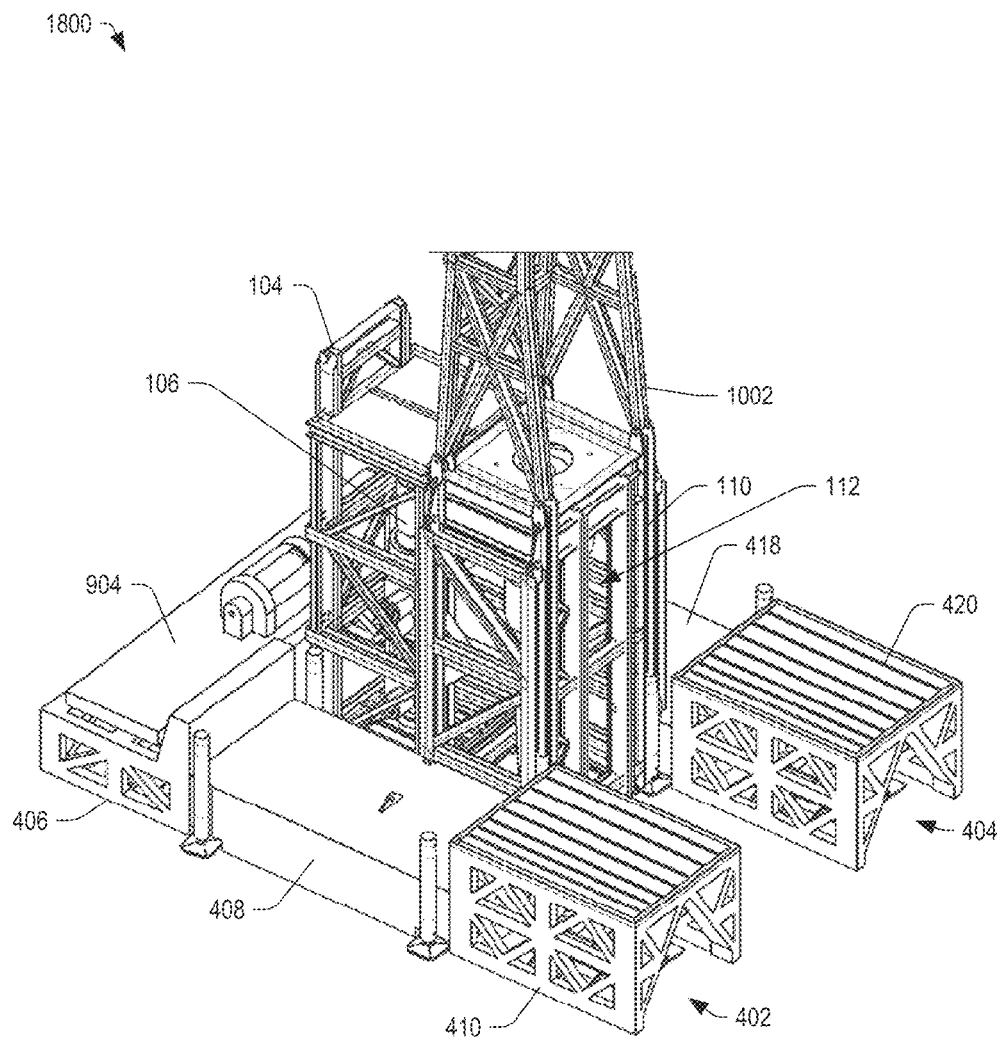
FIG. 18 depicts a perspective view of a partially rigged up land drilling rig of FIG. 16, in accordance with certain embodiments of the present disclosure.

FIG. 18 depicts a perspective view 1800 of a portion of the components of FIG. 16, in accordance with certain embodiments of the present disclosure. In the illustrated view, the rear trunk 104 includes BOP 106 and the center trunk 110 includes the top drive 112 beneath a drill floor at a top of the center trunk 110. The top drive equipment can be coupled to the traveling block.

Figure 19:
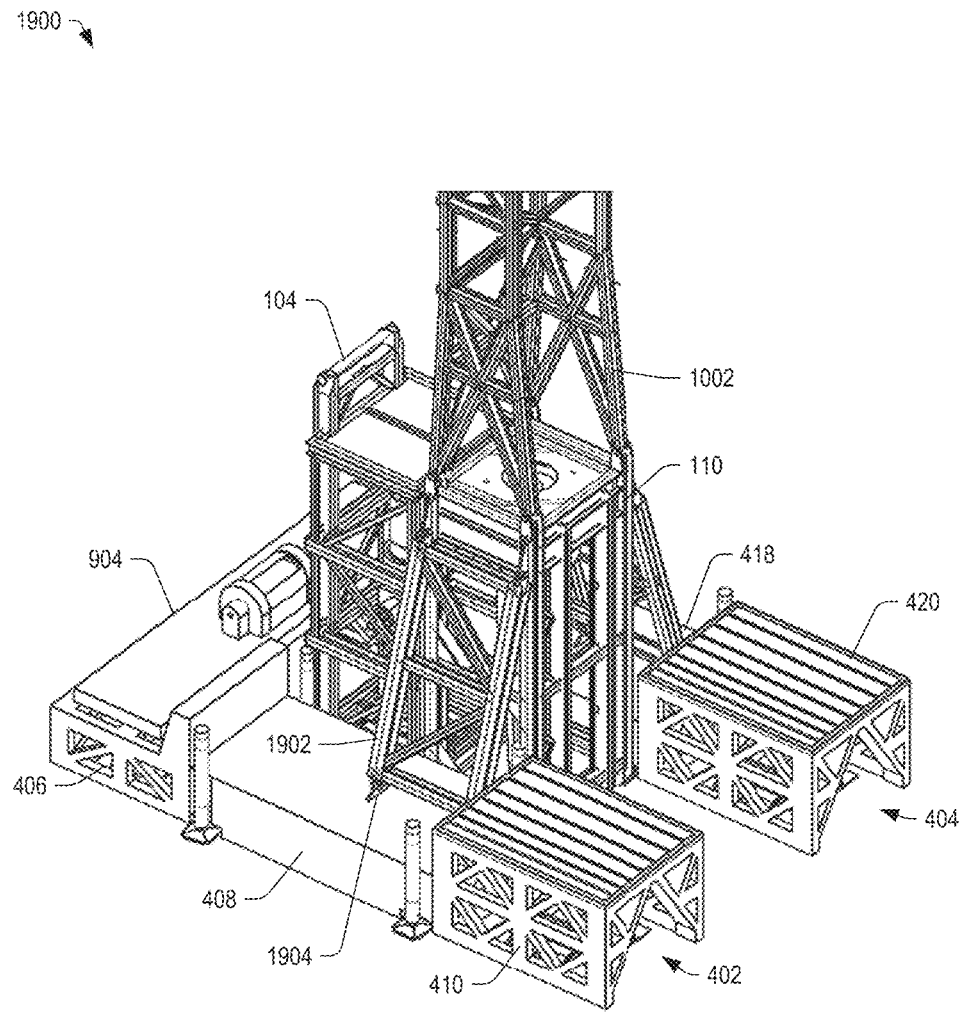
FIG. 19 depicts a perspective view of the partially rigged up land drilling rig of FIG. 18 including stability legs extended and bolted to the base boxes, in accordance with certain embodiments of the present disclosure.

FIG. 19 depicts a perspective view 1900 of the assembly of FIG. 18 including stability legs 1902 extended and bolted at a connection point 1904 to the base box 402 and the base box 404, in accordance with certain embodiments of the present disclosure. The stability legs 1902 may provide horizontal stability to the mast during operation.

In one possible alternative embodiment, rather than pinning or bolting the stability legs 1902 to the center portions 408 and 418 of the base boxes 402 and 404, which center portions 408 raise and lower, the stability legs 1902 may be configured to couple to the forward portions 410 and 420. In such a case, one or more connection points 1904 may be moved to the forward portions 410 and 420

In another possible alternative embodiment, one or more boxes or frames may be included that may be configured to couple to the base boxes 402 and 404 on either side of the center trunk 110 and the rear trunk 104, and which may provide a base for the driller's side cabin (cabin 2104 in FIG. 21) and for the off driller's side cabin (not shown). The additional boxes may also be used to provide stability in lieu of or in addition to the stability legs 1902.

In still another possible alternative embodiment, ladders, stairs or other egress elements may be provided that extend from the base boxes 402 and 404 to the drill floor. Such structures may be bolted to the center trunk 110, the rear trunk 104, and the base boxes 402 and 404, or any combination thereof, to provide stability. Other embodiments are also possible.

Figure 20:
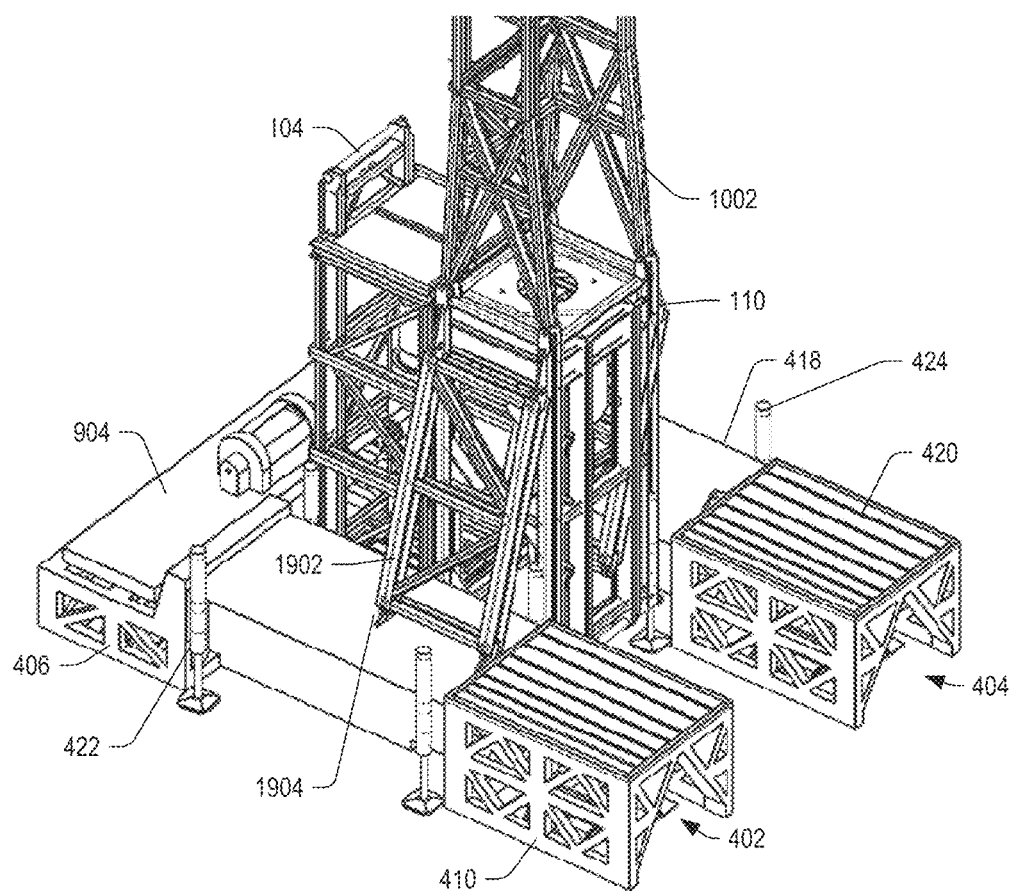
FIG. 20 depicts a perspective view of the partially rigged up land drilling rig of FIG. 19 with a center portion of the base boxes raised, in accordance with certain embodiments of the present disclosure.
Figure 21:
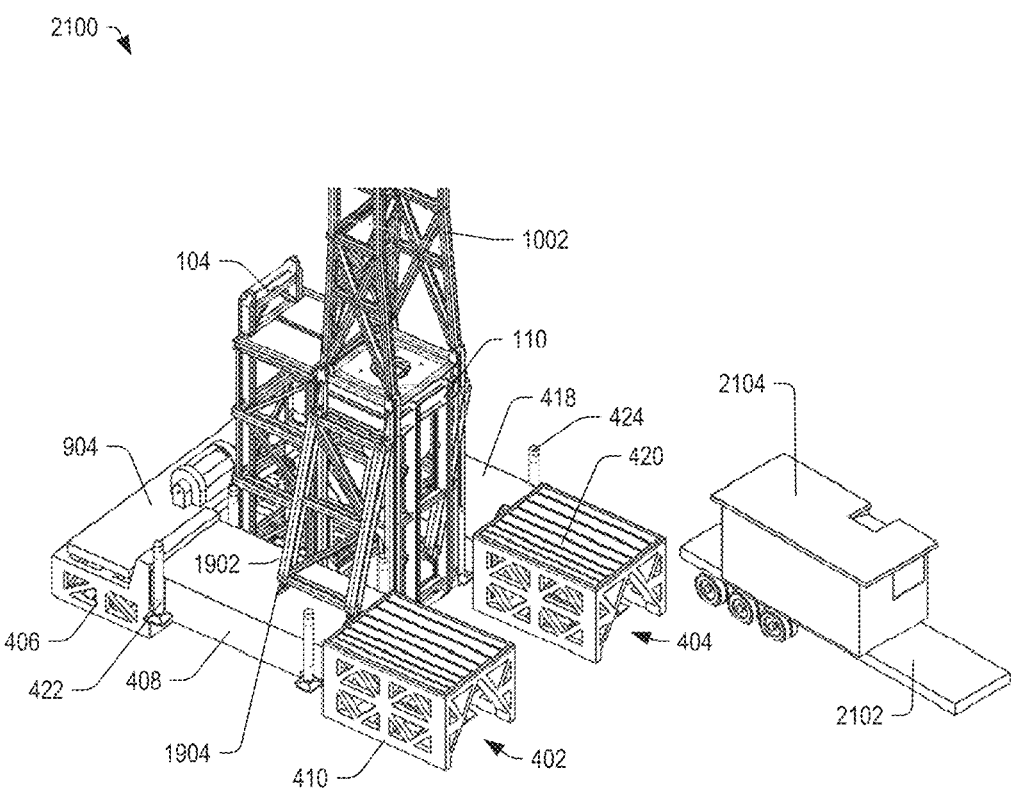
FIG. 21 depicts a perspective view of the partially rigged up land drilling rig of FIG. 20 with a driller's cabin being moved into position for mounting to the assembly, in accordance with certain embodiments of the present disclosure.

FIG. 20 depicts a perspective view 2000 of the assembly of FIG. 19 with center portions 408 and 418 (of the base box 402 and the base box 404) raised, in accordance with certain embodiments of the present disclosure. In certain embodiments, the control circuits 602 and 612 in FIG. 6, for example, may control the lift cylinders 422 and 424 to extend and raise the center portions 408 and 418, providing three to six feet of clearance, which may allow an operator to utilize the feet of the base box 402 and the base box 404 to walk the entire assembly over well heads and into position. In certain embodiments, once the lift cylinders 422 and 424 are used to raise the center portions 408 and 418, the center portions 408 and 418 may be pinned to the rear portions 406 and 416 and the setback portions 410 and 420 and the lift cylinders 422 and 424 may be raised as shown in FIG. 21.

In alternative embodiments, as mentioned above, the stability legs 1902 may be coupled to the forward portions 410 and 420 of the base boxes 402 and 404. Alternatively, additional frames or boxes may be coupled to the base boxes 402 and 404 on either side of the center trunk 110 to provide stability and optionally to support the drilling side cabin and the off drilling side cabin and to raise them to be even with the drill floor, for example. It should be appreciated that such additional frames or boxes may be used for securing various drilling equipment devices during storage and transportation and optionally for securing the various drilling equipment devices during operation. In an example, intermediate tanks and pumps may be stored in the frames or boxes during storage and transportation. During set up, the tanks may be removed from the frame and moved to a suitable location, while one or more of the pumps may remain housed within the box or frame, providing protection from the elements for the pump equipment and simplifying the connection process. Such equipment may be stored and housed in easy-to-assemble boxes that can rest on the base boxes 402 and 404 and under the cabins. In some embodiments, the drawworks skid 904 could also be one such box or frame, and some of the equipment may be stored within or may remain within the drawworks skid 904.

In still another alternative embodiment, ladders, stairs, or other egress elements may be provided that can be bolted to the center trunk 110 and to the base boxes 402 and 404 to provide stability and to provide ingress and egress to the drill floor. Other embodiments are also possible.

In other embodiments, the lift cylinders 422 and 424 may be omitted, and the center portions 408 and 418 may be constructed to provide three to six feet of clearance above the ground. In an example, the center portions 408 and 418 may be bolted, welded, or otherwise fixed to the rear portions 406 and 416 and the forward portions 410 and 420, respectively, in a raised position. In some embodiments, the center portions 408 and 418 may be elevated such that top surfaces of the center portions 408 and 418 may correspond to top surfaces of the forward portions 410 and 420 of the base boxes 402 and 404.

FIG. 21 depicts a perspective view 2100 of the components of FIG. 20 with a driller's cabin 2104 being moved into position for mounting to the center trunk 110, in accordance with certain embodiments of the present disclosure. In certain embodiments, the driller's cabin 2104 may be mounted to the rear trunk 104 and the center trunk 110 near the drill floor. In the following discussion and associated figures, the driller's cabin 2104 is omitted.

Figure 22:
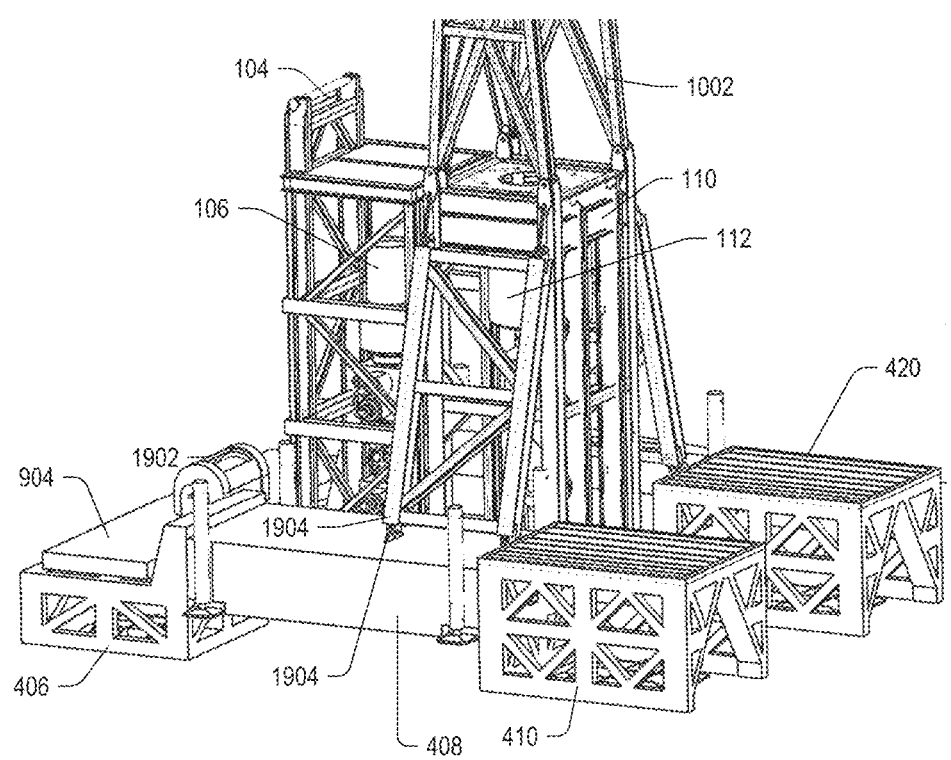
FIG. 22 depicts a perspective view of the partially rigged up land drilling rig of FIG. 20, in accordance with certain embodiments of the present disclosure.

FIG. 22 depicts a perspective view 2200 of the components of FIG. 20, in accordance with certain embodiments of the present disclosure. In the illustrated view 2200, the top drive 112 can be seen within the center trunk 110 and the BOP 106 is visible within the rear trunk 104. Further, the feet and the moving assemblies can be seen (at least partially) within the rear portion 406 and the setback portion 410.

Figure 23:
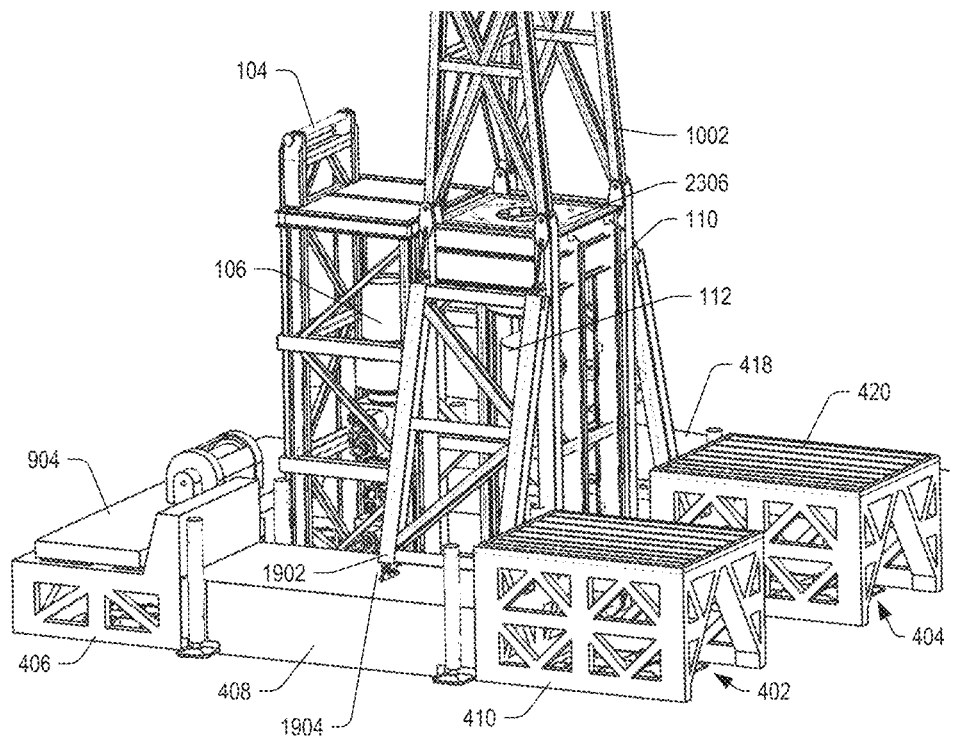
FIG. 23 depicts a perspective view of the partially rigged up land drilling rig of FIG. 22 with a drill floor configured to allow access for coupling a traveling block to a top drive, in accordance with certain embodiments of the present disclosure.

FIG. 23 depicts a perspective view 2300 of the components of FIG. 22 with a drill floor 2306 configured to allow access for coupling a traveling block 2402 (in FIG. 24) to a top drive 112, in accordance with certain embodiments of the present disclosure. In an example, the drill floor 2306 may be raised and the traveling block 2402 may be lowered through the opening in a top of the center trunk 110. The traveling block 2402 in FIG. 24 may be coupled to the top drive 112, which was stored within the center trunk 110 during storage, transit, and the earlier steps of the rig up process.

FIG. 24 depicts a perspective view 2400 of the components of FIG. 23 with the drill floor 2306 raised and with the traveling block 2402 coupled to the top drive 112, in accordance with certain embodiments of the present disclosure. The traveling block 2402 may be raised, lifting the top drive 112 above the drill floor 2306.

Figure 25:
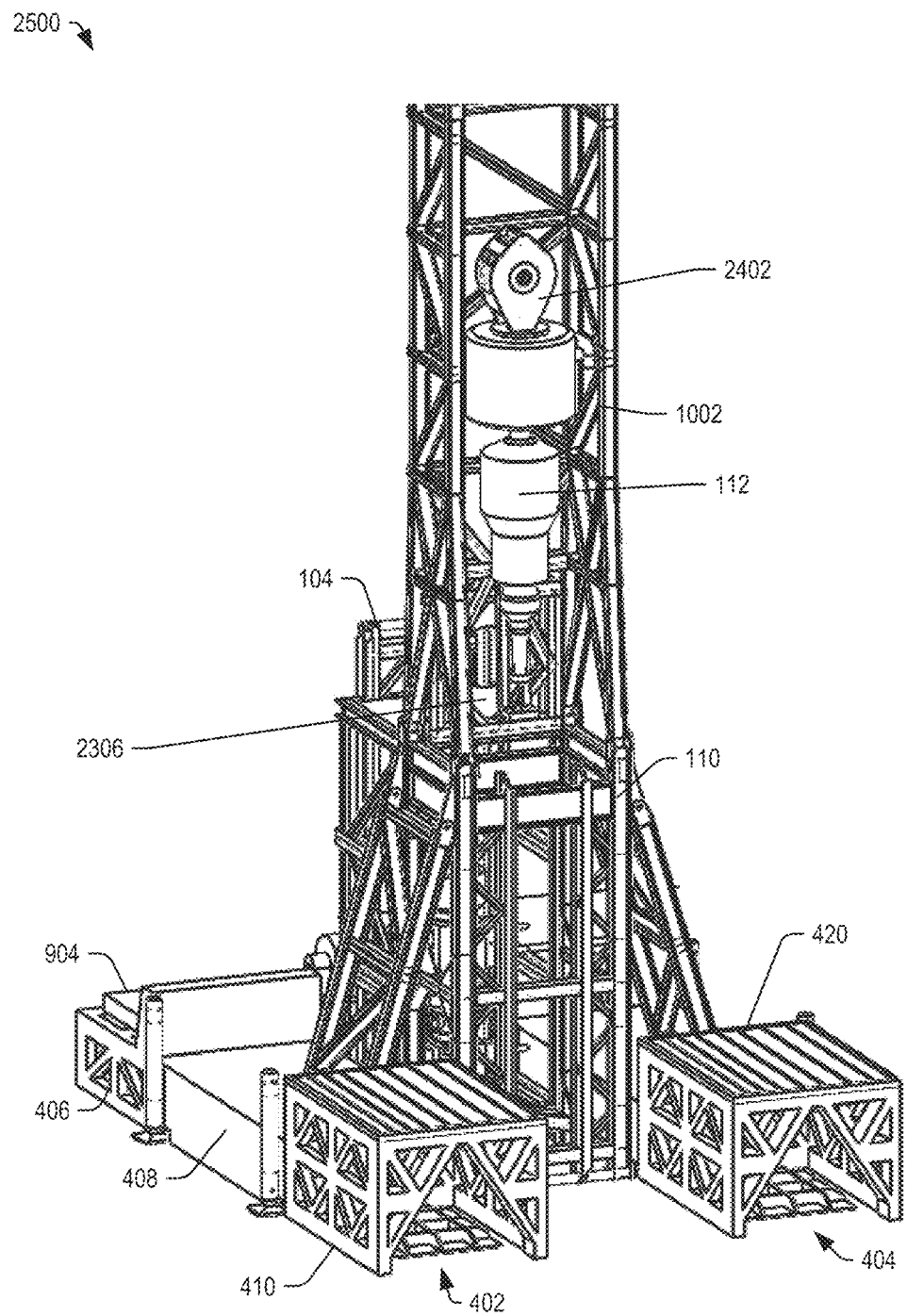
FIG. 25 depicts a perspective view of the assembly of FIG. 24 with the drill floor raised, in accordance with certain embodiments of the present disclosure.

FIG. 25 depicts a perspective view 2500 of the components of FIG. 24 with the drill floor 2306 raised, in accordance with certain embodiments of the present disclosure. The traveling block 2402 and the top drive 112 have been raised above the drill floor 2306.

Figure 26:
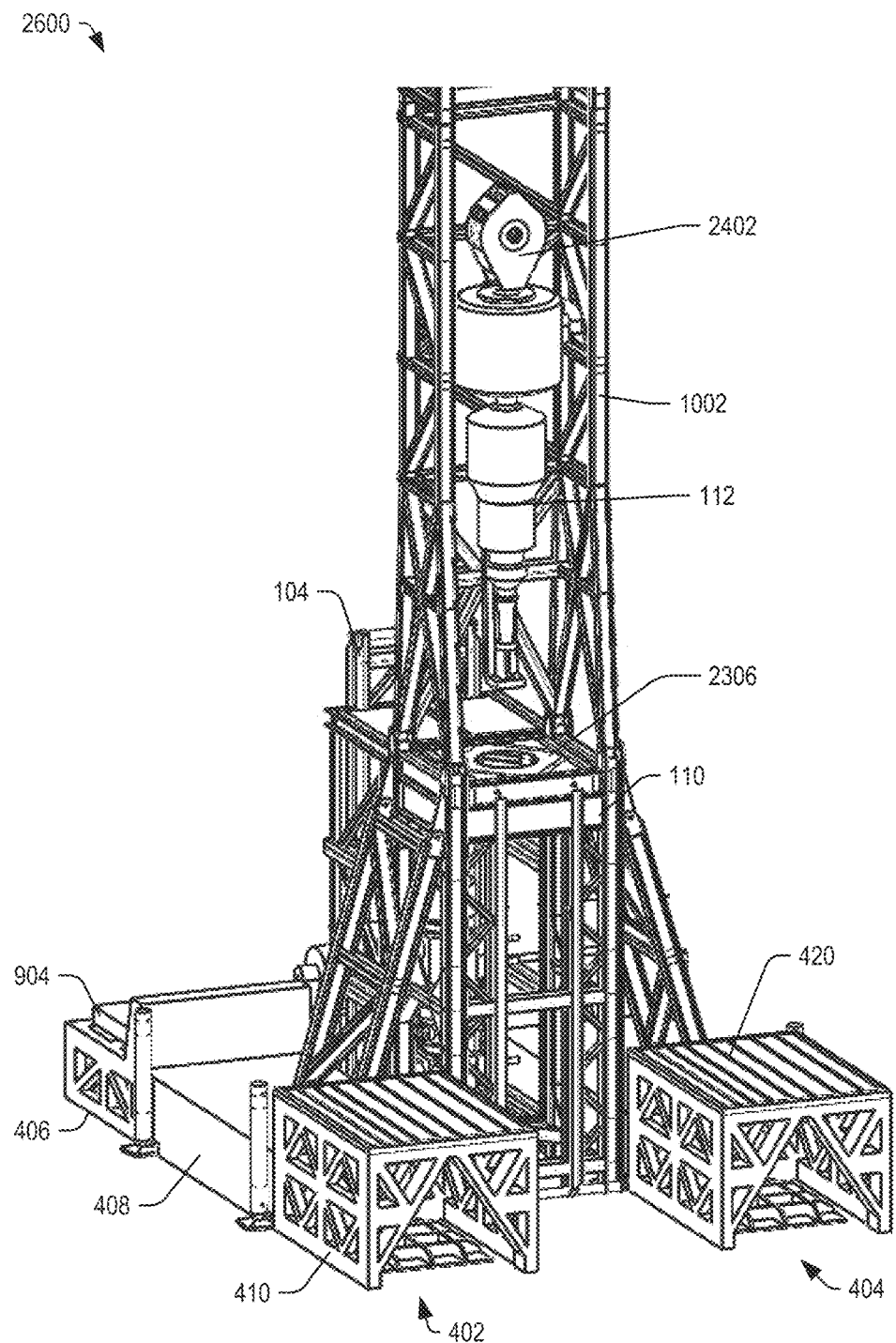
FIG. 26 depicts a perspective view of the partially rigged up land drilling rig of FIG. 24 with the drill floor lowered, in accordance with certain embodiments of the present disclosure.

FIG. 26 depicts a perspective view 2600 of the components of FIG. 25 with the drill floor 2306 lowered, in accordance with certain embodiments of the present disclosure. The traveling block 2402 and the top drive 112 have been raised above the drill floor 2306.

Figure 27:
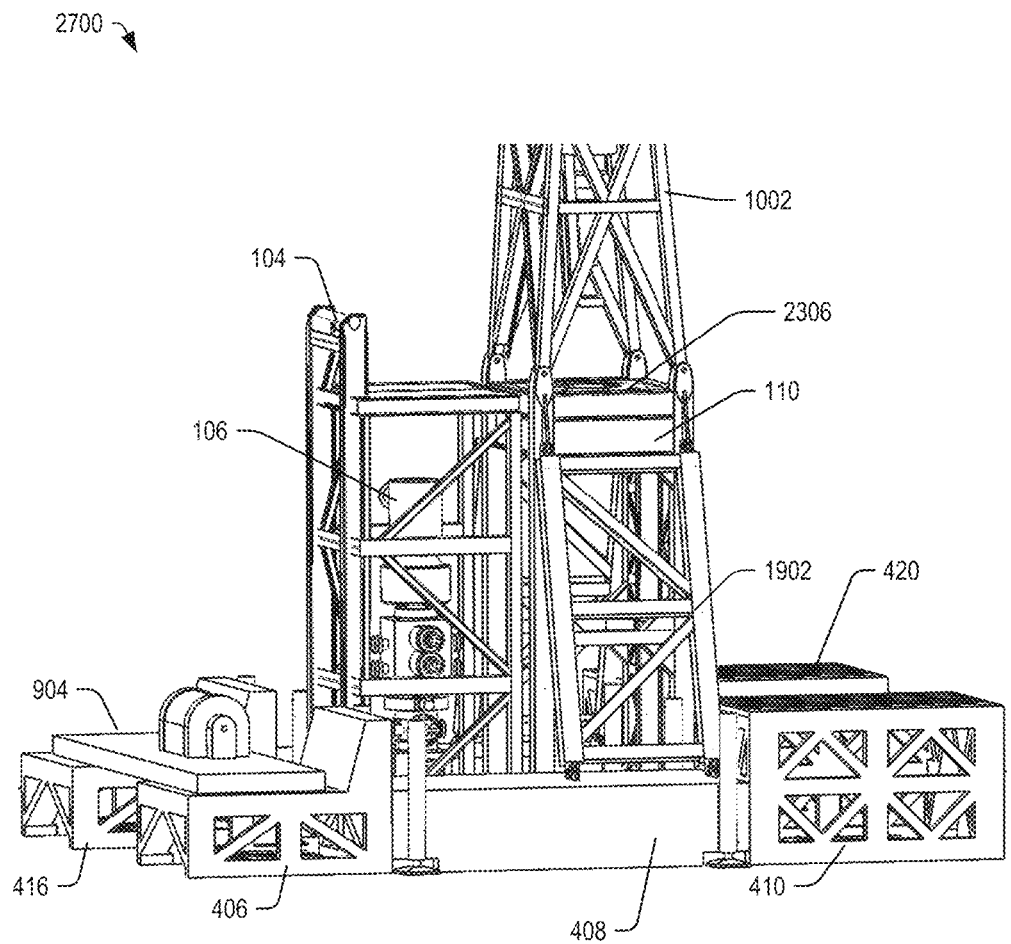
FIG. 27 depicts a perspective view of the partially rigged up land drilling rig of FIG. 26 with a blowout preventer (BOP) secured within the rear trunk, in accordance with certain embodiments of the present disclosure.

FIG. 27 depicts a perspective view 2700 of the components of FIG. 26 with a BOP 106 secured within the rear trunk 104, in accordance with certain embodiments of the present disclosure. The rear trunk 104 serves to secure, store, and protect the BOP 106 during transportation and rig assembly processes.

Figure 28:
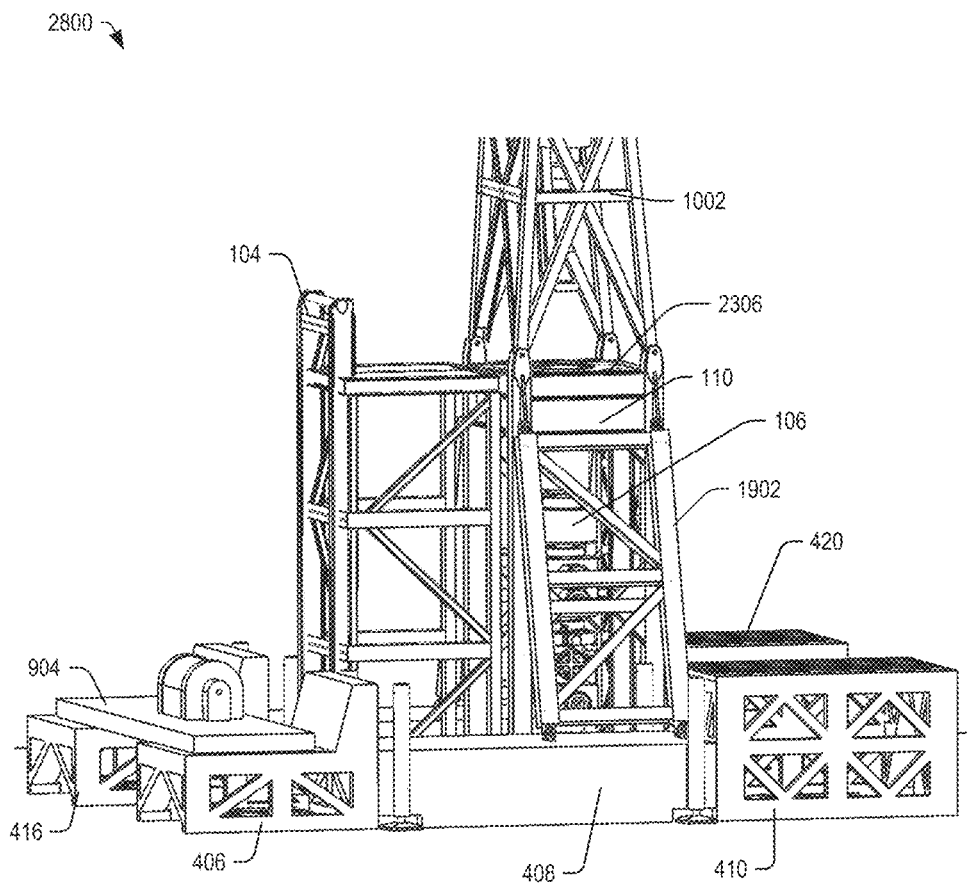
FIG. 28 depicts a perspective view of the rigged up land drilling rig of FIG. 27 with the BOP repositioned beneath the drill floor of the center trunk, in accordance with certain embodiments of the present disclosure.

FIG. 28 depicts a perspective view 2800 of the components of FIG. 27 with the BOP 106 repositioned beneath the drill floor 2306 of the center trunk 110, in accordance with certain embodiments of the present disclosure. In certain embodiments, moving systems in the rear trunk 104 and the center trunk 110 may be used to reposition the BOP 106. In the illustrated example, the BOP 106 may be coupled to a flange associated with the wellhead.

Figure 29:
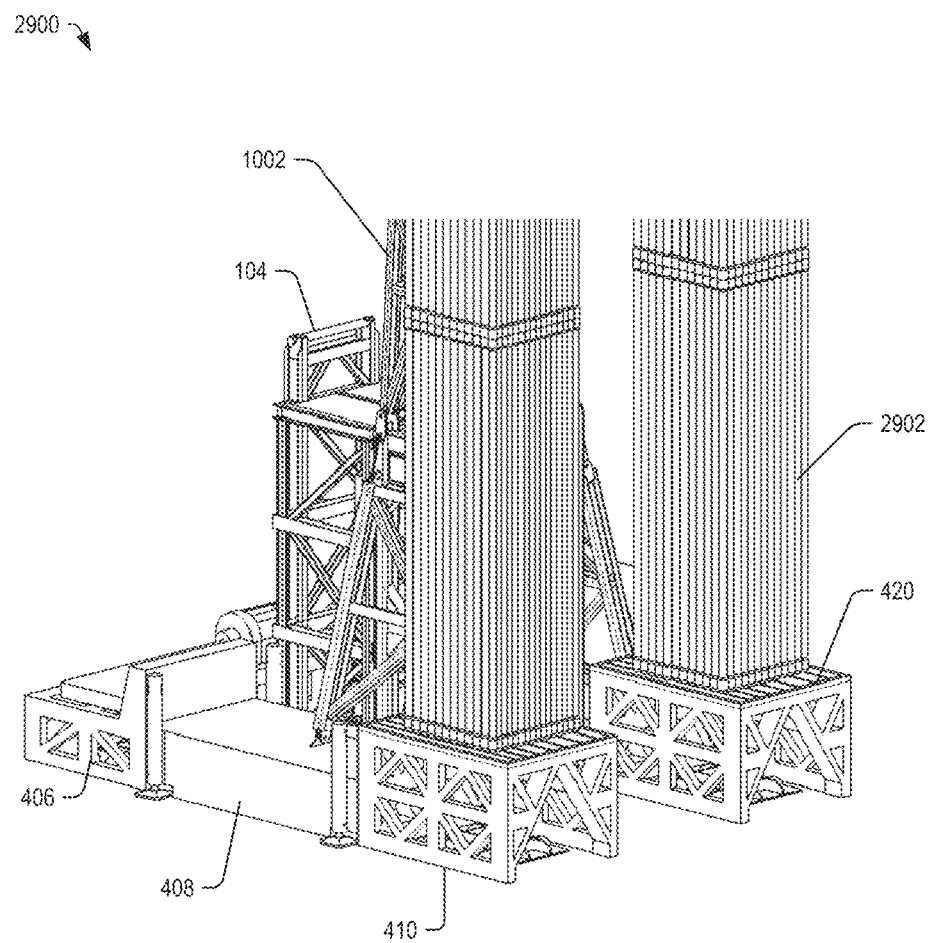
FIG. 29 depicts a perspective view of the drilling rig of FIG. 28 including a plurality of pipe sections (the setback) resting on the setback areas of the base boxes and having a top portions secured by the pipe racking truss, in accordance with certain embodiments of the present disclosure.

FIG. 29 depicts a perspective view 2900 of the drilling rig of FIG. 28 including a plurality of stands 2902 resting on setback areas of the forward portions 410 and 420 of the base boxes 402 and 404 and secured by the pipe racking truss 1302, in accordance with certain embodiments of the present disclosure. In some embodiments, by resting the pipe sections on the forward portions 410 and 420 of the base boxes 402 and 404, the load may be distributed through the base boxes 402 and 404 and to the ground.

In some embodiments, in addition to the stands 2902, vertical tubular columns may be included near the outboard ends of the pipe racking truss 1302. These columns can be braced on the ground or on the forward portions 410 and 420 of the base boxes and can decrease deflections in the pipe racking truss 1302 and increase stability of the mast.

Figure 30:
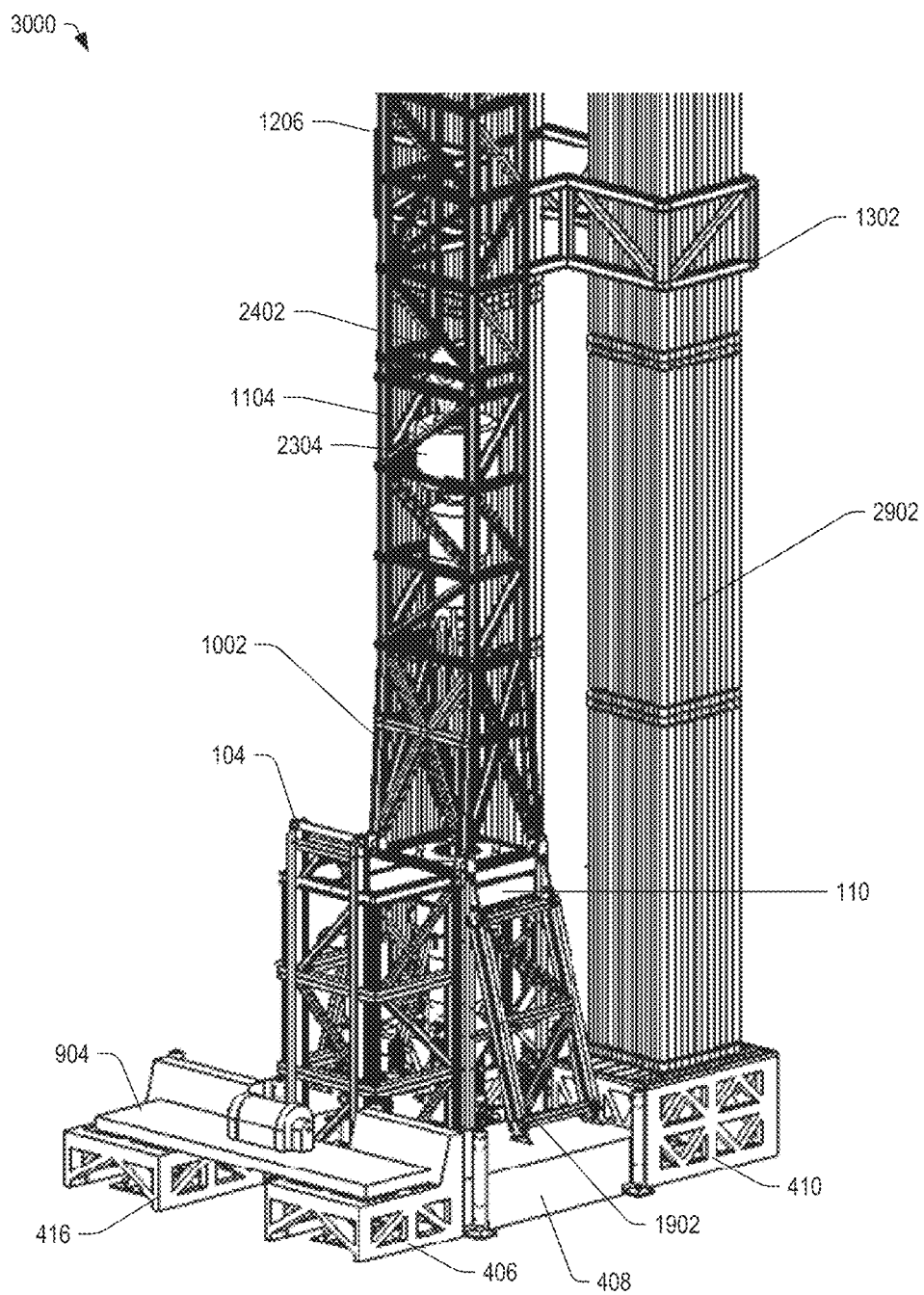
FIG. 30 depicts a perspective view of the drilling rig of FIG. 29, in accordance with certain embodiments of the present disclosure.

FIG. 30 depicts a perspective view 3000 of the drilling rig of FIG. 29, in accordance with certain embodiments of the present disclosure. In the illustrated view, the stands 2902 are secured within the pipe racking truss 1302 and rest on the setback portions 410 and 420 of the base box 402 and the base box 404.

Figure 31:
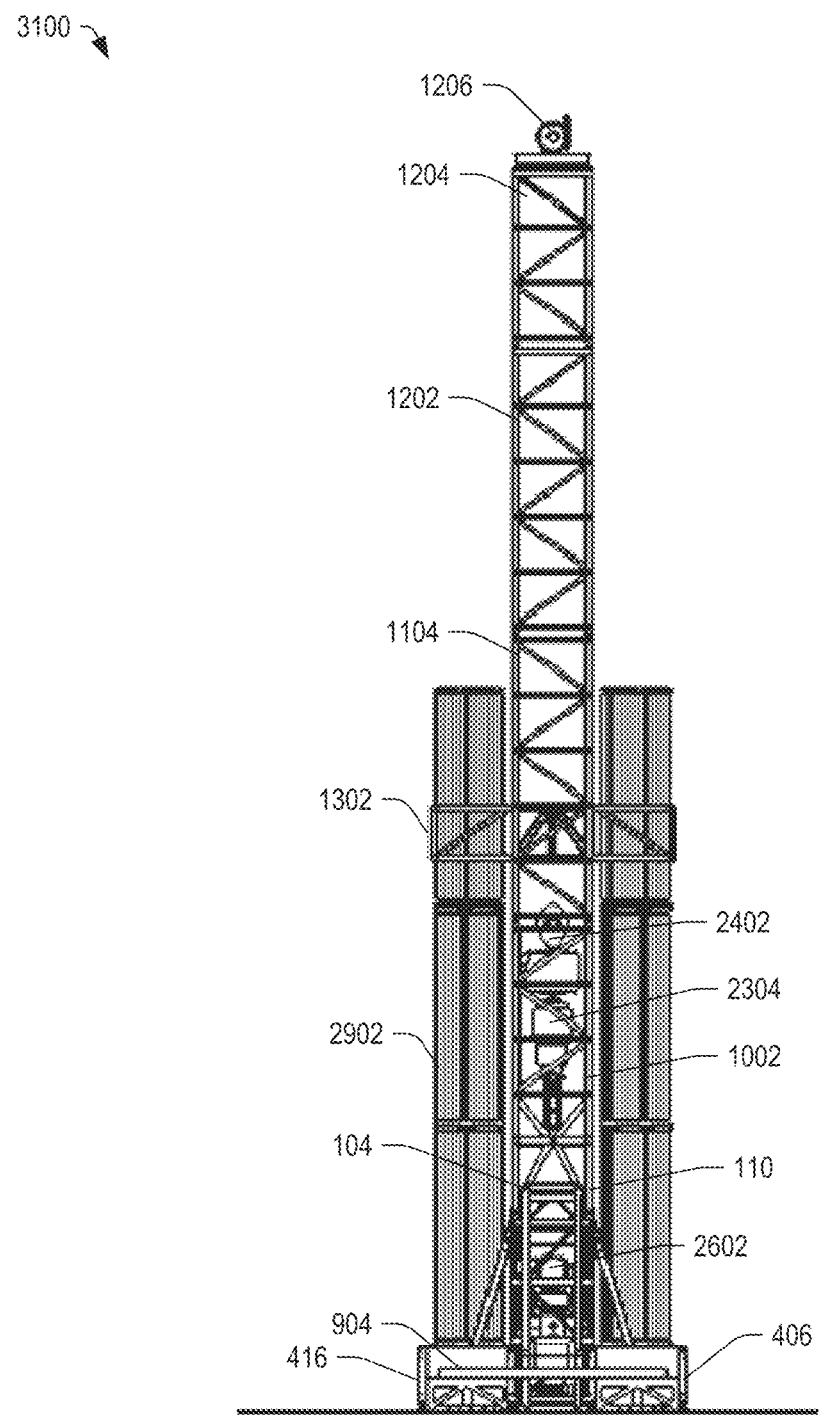
FIG. 31 depicts a side view of the drilling rig of FIG. 30 from a rear drawworks perspective, in accordance with certain embodiments of the present disclosure.

FIG. 31 depicts a side view 3100 of the drilling rig of FIG. 30 from a drawworks perspective, in accordance with certain embodiments of the present disclosure. From this view 3100, the stands 2902 are shown resting on the setbacks 410 and 420 and held by the pipe racking truss 1302.

Figure 32:
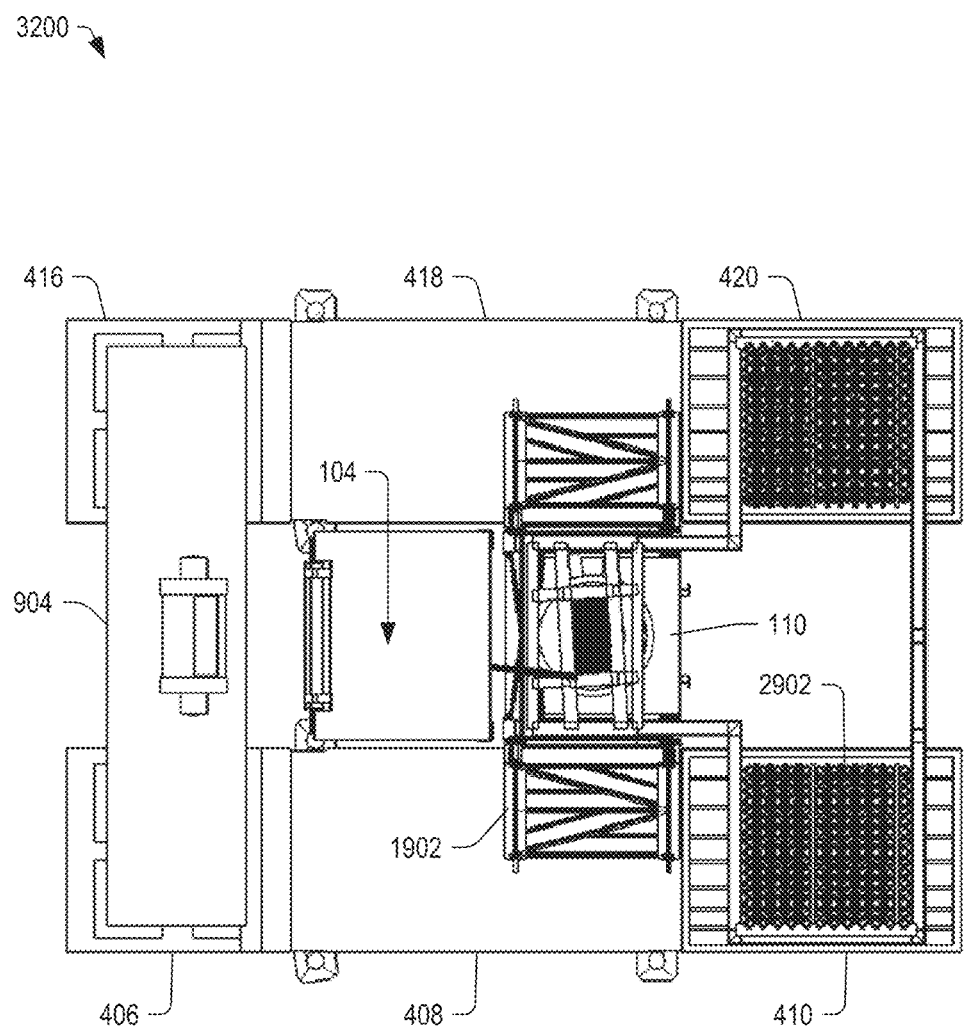
FIG. 32 depicts a top view of the drilling rig of FIG. 30, in accordance with certain embodiments of the present disclosure.

FIG. 32 depicts a top view 3200 of the drilling rig of FIG. 30, in accordance with certain embodiments the present disclosure. From the top view 3200, the stability legs 1902 are shown on both sides of the center trunk 110. Further, the stands 2902 are shown resting on the setbacks 410 and 420.

Figure 33:
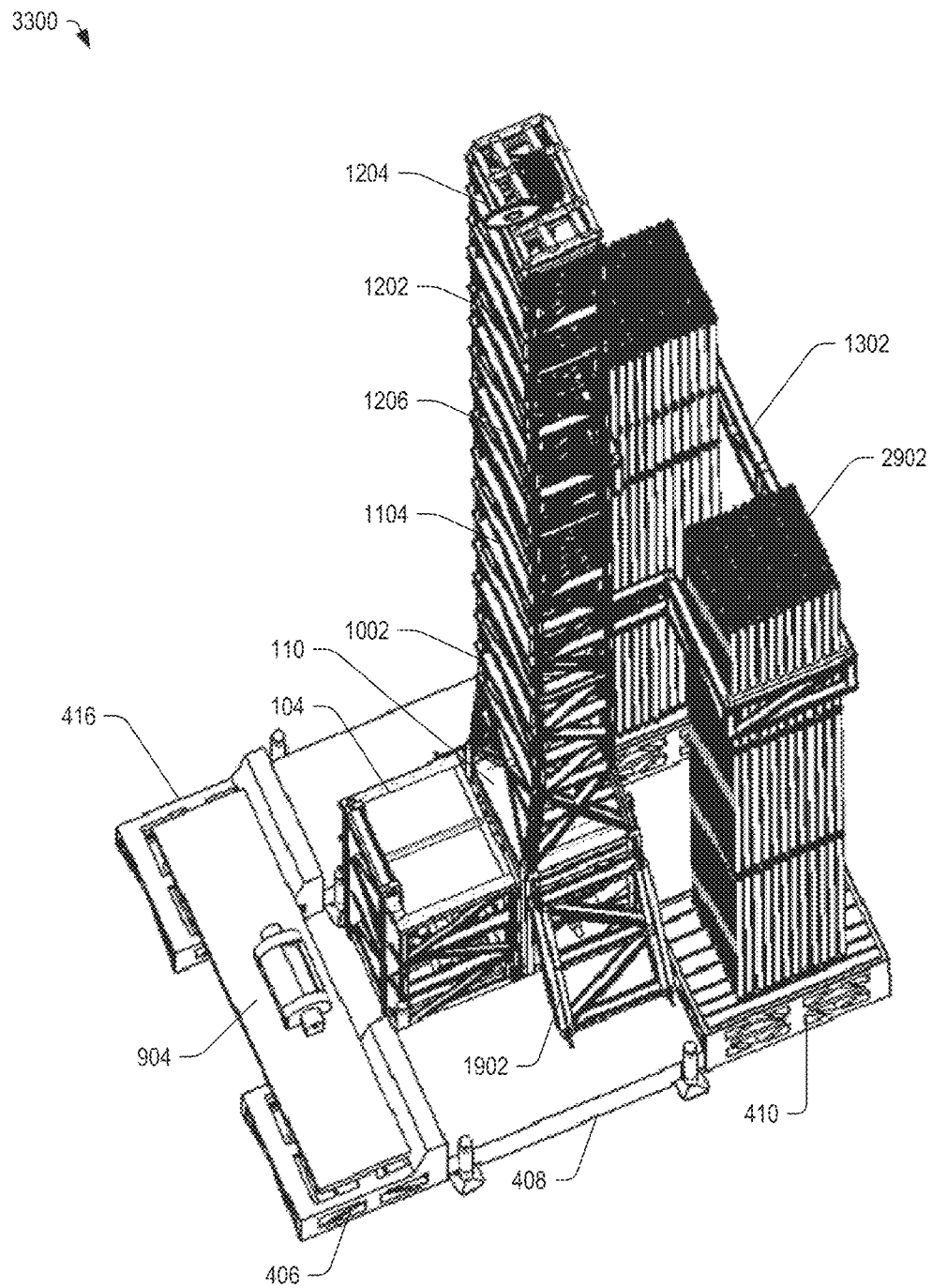
FIG. 33 depicts a top perspective view of the drilling rig of FIG. 30, in accordance with certain embodiments of the present disclosure.

FIG. 33 depicts a top perspective view 3300 of the drilling rig of FIG. 30, in accordance with certain embodiments of the present disclosure. In the illustrated example, the stands 2902 may rest on the setbacks 410 and 420 and may be secured by the pipe racking truss 1302.

FIG. 34 depicts a front perspective view 3400 of the drilling rig of FIG. 30, in accordance with certain embodiments of the present disclosure. In the illustrated example, the drill string may extend from the top drive 112 through the drill floor 2306, through the BOP 106, and downhole.

In conjunction with the systems, methods and devices described above with respect to FIGS. 1-34, a drilling rig may be formed from a plurality of structural elements, at least some of which may perform a dual function of securing and storing drilling equipment during transportation and of providing a structural aspect of the drill rig, such as a trunk section, a mast section, a pipe racking truss; and so on. By providing dual use structures, not only is the equipment protected during transit, but the skid or protection component can be used as part of the drilling rig structure, which reduces the overall footprint and weight of the drilling rig.

In certain embodiments, the traveling equipment can be stored and transported in the center trunk. The traveling equipment may include all or a portion of the assembly, depending on the rig requirements. By securing the traveling equipment in the center trunk, the expensive and slightly delicate traveling equipment is easily readied for shipping mode (or storage) and the center trunk protects the equipment during transport and rig erection sequences. Accordingly, manpower reduction, time savings, and equipment protection are achieved.

In certain embodiments, the center truck serves as the main drill floor component to which the mast can be pinned. The center truck and the mast can be raised together, although they may be separated and raised in separate fashions depending on the rig requirements. Raising of the mast may be achieved by many different methods, such as hydraulic cylinders, winch and wire rope systems, activated levers, counterweights, etc.

In certain embodiments, the drilling mast can be assembled and outfitted very close to the ground, thus saving time, increasing safety and making rig-up work easier. Further, by raising the center trunk, the drill floor, and the mast together in one piece, big time savings and labor savings are achieved.

The BOP may be stored in the rear trunk during transit. Once raised, the center truck becomes the work envelope for the rig's single BOP while the rig is drilling. The BOP can be moved from the storage/transit position in the rear truck into the center truck and over the well center by various means, which can include an overhead trolley, a hoist, bottom rails, or any combination thereof.

In certain embodiments, the rear trunk serves as the BOP storage/transport carrier and includes a test stump for conducting BOP tests. Some or all of the accumulator equipment can be located in the frame. Further, in some embodiments, some or all of the equipment needed to service the BOP can be located in the rear trunk (or in a carrier attached to the rear trunk). As discussed above, the rear trunk can be leaned over into a horizontal position for shipping on a standard trailer. By securing the BOP in the rear trunk, safety is enhanced, time and labor savings are realized, and equipment damage is prevented while rigging-up/down the BOP for shipping. Having the accumulator and all equipment and tools in the shipping frame decreases the number of separate item to be moved and saves move time. Additional time and labor are saved by having all related equipment close together.

In certain embodiments, the setback areas atop the walking feet, located just above the ground, provides a number of advantages, particularly when combined with a rig having a pipe handling system. In some embodiments, a supporting structure in front of the well at the drill floor can be omitted. Instead, the setback loads during rig drilling operations, and when the drill rig is being moved using the walking feet, the setback loads can travel directly into the walking system and then into the ground through the setbacks on the base boxes. The setback areas can be made as large as necessary for the drilling rig, and the setback area arrangement can be varied as needed without increasing the rig weight. Further, the setback boxes over the walking feet can also serves as a protective cage for the walking feet.

In certain embodiments, the pipe racking truss (or racking board truss) can serve a as a shipping container for a pipe-handling system. During assembly, the pipe racking truss may be installed on the mast. During drilling operations, the pipe racking truss may secure pipe sections and may provide additional support for the mast. The Racking Board truss is easy to ship on a standard trailer, plus is easy to install on the mast while it is being raised.

In certain embodiments, the base boxes can both unload themselves off a trailer and walk over to a selected position adjacent to a trunk assembly. In certain embodiments, the rear trunk and center trunk may be locked to the base boxes. Further, the base boxes enable the center trunk to pivot into a vertical orientation. Further, the center sections of the base boxes may include lift legs that may be used to raise the center portions (and optionally to elevate the center trunk to elevate them drill floor and mast), thus providing well clearance as the rig is walking on the pad drilling site.

In certain embodiment, by stacking the pipe sections in the pipe racking truss and on the setback portions of the base boxes, the load created by the pipe sections travels through the base boxes to the ground, providing added stability. Two or more of the pipe sections may fit between the corners of the pipe racking truss and the setback portion of the base boxes to stabilize the pipe racking truss. The combination of the loading and the enhanced support provided by the setback and the pipe racking truss can allow the rig to withstand storm wind conditions without having to unload the setback, even in a storm with winds of 100 knots or more.

In certain embodiments, the mast portion may be raised and the entire assembly process may be completed without using a crane, providing a "craneless" rig-up. By utilizing actuators within the lower intermediate mast portion 1104 or within other portion so of the mast, the center trunk, or any combination thereof, the assembled mast can be raised to enable coupling of the pipe racking truss 1302. Additionally, from the partially raised state, the mast may be more readily raised to a vertical, assembled state. Similarly, actuators may be included within the center trunk or rear trunk and may be configured to slow the final stages of the raising process or to facilitate the initial stages of the disassembly process involving lowering the trunk. Other embodiments are also possible.

Additionally, as discussed above, the frame elements used to form various elements of the drilling rig may serve a dual purpose: 1) securing of drilling equipment during storage and transportation and 2) forming or providing support for the drilling rig structures during operation. Further, the base boxes on which the rig may be assembled can include a plurality of movable feet that allow the entire assembled rig to walk. The feet may be raised, shifted, and lowered iteratively and in conjunction with movements of the other feet to walk the rig to a desired position. Other embodiments are also possible.

Although the present invention has been described with reference to preferred embodiments, workers skilled in the art will recognize that changes may be made in form and detail without departing from the scope of the invention.

What is claimed is:

1. A drilling rig comprising:
   a rear trunk defining a first enclosure sized to receive a first piece of drilling equipment;
   a center trunk defining a second enclosure sized to receive a second piece of drilling equipment; and
   an alignment frame coupled to an edge of the rear trunk and to an edge of the center trunk during unloading of one of the rear trunk and the center trunk from a trailer to align them during unloading, the alignment frame configured to define a first pivot axis coupled to the center trunk and about which the center trunk pivots from a horizontal orientation to a vertical orientation, the alignment frame configured to further define a second pivot axis coupled to the rear trunk and about which the rear trunk pivots from a horizontal orientation to a vertical orientation toward the center trunk, the alignment frame further including a hinged center portion between the first and second pivot axes, the alignment frame configured to couple a bottom portion of the center trunk to a bottom portion of the rear trunk.

2. The drilling rig of claim 1, wherein the rear trunk and the center trunk operate as shipping containers for equipment during transit and as supporting structures of a drill rig during operation.

3. The drilling rig of claim 1, wherein the center trunk includes a support structure for securing at least some traveling equipment during transit.

4. The drilling rig of claim 3, wherein the center trunk further includes a moving system configured to facilitate positioning and operational support of a blowout preventer.

5. The drilling rig of claim 1, wherein the rear trunk includes a support structure for securing a blowout preventer during transit.

6. The drilling rig of claim 1, further comprising:
   a Driller's Side (DS) base box including a rear portion, a center portion, and a forward portion, the rear portion and the forward portion defining enclosures housing moveable feet actuatable to move the DS base box to a selected location; and
   an Off Driller's Side (ODS) base box including a rear portion, a center portion, and a setback portion, the rear portion and the setback portion defining enclosures housing moveable feet actuatable to move the ODS base box to the selected location.

7. The drilling rig of claim 6, wherein each of the DS base box and the ODS base box includes lift cylinders configured to raise the DS base box and the ODS base box to unload from trailers.

8. The drilling rig of claim 6, wherein each of the center portions of the DS base box and the ODS base box includes lift cylinders configured to raise the center portion vertically relative to the rear portion and the forward portion.

9. The drilling rig of claim 6, wherein the forward portions of the DS and ODS base boxes can include a setback portion.

10. The drilling rig of claim 6, wherein the center portions of the DS and ODS base boxes are fixed in a position above the ground to provide clearance.

11. The drilling rig of claim 6, wherein the DS and ODS base boxes are pinned to the center trunk and the rear trunk.

12. The drilling rig of claim 1, further comprising:
   one or more mast sections coupled to the center trunk in the horizontal orientation;
   a pipe racking truss coupled to one or more of the mast sections while in the horizontal orientation; and
   wherein the center trunk is pivoted relative to the frame to raise the center trunk and the one or more mast sections into the vertical orientation.

13. The drilling rig of claim 6, further comprising a setback configured to rest on the forward portion of the DS and ODS base boxes and including upper ends secured by a pipe racking truss.

14. The drilling rig of claim 12, wherein at least one of the one or more mast sections includes an actuator configured to partially raise the one or more mast sections from a horizontal angle to a second angle that is between a horizontal angle and a vertical angle.

15. A drilling rig comprising:
   a Driller's Side (DS) base box including a rear portion, a center portion, and a forward portion, the rear portion and the forward portion defining enclosures housing moveable feet actuatable to move the DS base box to a selected location;
   an Off Driller's Side (ODS) base box including a rear portion, a center portion, and a setback portion, the rear portion and the setback portion defining enclosures housing moveable feet actuatable to move the ODS base box to the selected location;
   a center trunk coupled to the DS base box and the ODS base box and configured to form a base of a mast of a drilling rig;
   a rear trunk; and
   an alignment frame coupled to an edge of the rear trunk and to an edge of the center trunk, the alignment frame including a first pivot axis coupled to an edge of the center trunk and including a second pivot axis coupled to an edge of the rear trunk;
   wherein the moveable feet within the DS base box and the ODS base box are configured to raise and walk the drilling rig to a selected position; and
   wherein the DS and ODS base boxes are pinned to the center trunk and the rear trunk.

16. The drilling rig of claim 15, further comprising:
   the alignment frame configured to align the rear trunk and to the center trunk during unloading of one of the rear trunk and the center trunk from a trailer;

the center trunk configured to pivot about the first pivot axis from a horizontal orientation to a vertical orientation; and the rear trunk configured to pivot about the second pivot axis from the horizontal orientation to the vertical orientation.

17. The drilling rig of claim 16, wherein at least one of the center trunk and the rear trunk secures a piece of drilling equipment during storage and during transport.

18. A drilling rig comprising:
a plurality of frame elements, at least some of the frame elements configured to secure a piece of drilling equipment during storage and during transport and configured to form a portion of drill rig structure during operation, the plurality of frame elements including:
a first trunk portion configured to secure a blow out preventer (BOP) device during storage and transport, the first trunk portion comprising a rear trunk of the drilling rig during operation; and
a second trunk portion configured to secure traveling equipment during storage and transport, the second trunk portion comprising a center trunk of the drilling rig during operation, and
an alignment frame including a first pivot axis coupled to an edge of the first trunk portion and including a second pivot axis coupled to an edge of the second trunk portion, the first trunk portion configured to pivot about the first pivot axis from a horizontal orientation to a vertical orientation, the second trunk portion configured to pivot about the second pivot axis from the horizontal orientation to the vertical orientation, the first and second trunk portions configured to form a support structure of the drilling rig.

19. The drilling rig of claim 18, further comprising:
a Driller's Side (DS) base box including a rear portion, a center portion, and a forward portion, the rear portion and the forward portion defining enclosures housing moveable feet actuatable to move the DS base box to a selected location; and
an Off Driller's Side (ODS) base box including a rear portion, a center portion, and a setback portion, the rear portion and the setback portion defining enclosures housing moveable feet actuatable to move the ODS base box to the selected location;
wherein the ODS base box and the DS base box are pinned to the first trunk portion and the second trunk portion.

20. The drilling rig of claim 18, wherein the plurality of frame elements include one or more mast sections and a pipe racking truss; and
wherein at least one of the one or more mast sections includes an actuator configured to at least partially raise the one or more mast sections from a horizontal angle to a second angle to facilitate attachment of the pipe racking truss.

* * * * *